United States Patent
Shafi et al.

(10) Patent No.: US 12,034,712 B2
(45) Date of Patent: Jul. 9, 2024

(54) COMMUNICATION BETWEEN SERVER SYSTEMS IN DIFFERENT NETWORK REGIONS

(71) Applicant: PayPal, Inc., San Jose, CA (US)

(72) Inventors: Mohammed Saleem Shafi, Austin, TX (US); Colin Sng, Round Rock, TX (US); Vanchinathan Ayipalayam Chandrasekaran, Georgetown, TX (US); Paul Edward Krautz, Austin, TX (US); Satya Ganesh Simhachalam Malla Venkata, Fremont, CA (US); Christopher Diebold O'Toole, Cedar Park, TX (US)

(73) Assignee: PayPal, Inc., San Jose, CA (US)

( * ) Notice: Subject to any disclaimer, the term of this patent is extended or adjusted under 35 U.S.C. 154(b) by 401 days.

(21) Appl. No.: 17/364,363

(22) Filed: Jun. 30, 2021

(65) Prior Publication Data

US 2022/0337572 A1 Oct. 20, 2022

Related U.S. Application Data

(60) Provisional application No. 63/175,803, filed on Apr. 16, 2021.

(51) Int. Cl.
*H04L 9/40* (2022.01)
*H04L 67/1004* (2022.01)

(52) U.S. Cl.
CPC .......... *H04L 63/08* (2013.01); *H04L 67/1004* (2013.01)

(58) Field of Classification Search
CPC ............................ H04L 63/08; H04L 67/1004
See application file for complete search history.

(56) References Cited

U.S. PATENT DOCUMENTS 6,836,805 B1* 12/2004 Cook .................. H04W 12/086
709/227
7,130,630 B1* 10/2006 Enzmann ................ H04W 4/20
340/988

(Continued)

OTHER PUBLICATIONS

Wikipedia; Data localization; page was last edited on May 1, 2021; https://en.wikipedia.org/w/index.php?title=Data_localization&oldid=1020938882; 3 pages.

*Primary Examiner* — Aravind K Moorthy
(74) *Attorney, Agent, or Firm* — Kowert, Hood, Munyon, Rankin & Goetzel, P.C.; Dean M. Munyon

(57) ABSTRACT

Techniques are disclosed relating to the communication between server systems located in different network regions. For example, in some embodiments, a first server system located in a first network region may receive a request to perform a first operation for a user, where the request includes an alias value for the user. The first server system may determine, based on the alias value, that the user is not associated with the first network region. In response, the first server system may access an alias map that specifies encoded versions of alias values that are in use across multiple different network regions and, using the alias map, determine that the user is associated with a second network region. The first server system may then route a communication corresponding to the request to a second server system that is located in the second network region.

20 Claims, 14 Drawing Sheets

(56) References Cited

U.S. PATENT DOCUMENTS

| | | | |
|---|---|---|---|
| 8,516,132 B2* | 8/2013 | Selgas | H04L 63/083 709/227 |
| 8,930,274 B1* | 1/2015 | Brickell | G06Q 20/40 705/67 |
| 8,978,147 B2* | 3/2015 | Chaganti | H04L 63/105 726/28 |
| 9,027,105 B1* | 5/2015 | Saylor | H04W 12/069 709/224 |
| 9,282,098 B1* | 3/2016 | Hitchcock | H04L 63/0281 |
| 9,460,438 B1* | 10/2016 | Bender | G06F 21/6245 |
| 9,461,898 B2* | 10/2016 | Ortega-Binderberger | H04W 12/06 |
| 9,641,503 B2* | 5/2017 | Mehta | G06F 21/31 |
| 9,781,602 B1* | 10/2017 | Girdhar | H04W 4/021 |
| 9,800,517 B1* | 10/2017 | Anderson | H04L 63/0428 |
| 9,924,315 B1* | 3/2018 | Cornwall | H04W 4/022 |
| 9,961,493 B1* | 5/2018 | Rifkin | G06F 16/955 |
| 10,187,745 B1* | 1/2019 | Zhao | H04L 43/10 |
| 10,339,150 B1* | 7/2019 | Silk | G06F 16/24578 |
| 10,404,615 B2* | 9/2019 | Marshall | H04L 63/107 |
| 10,681,148 B1* | 6/2020 | Wang | H04L 67/306 |
| 10,726,491 B1* | 7/2020 | Hockey | H04L 63/1433 |
| 10,735,890 B1* | 8/2020 | Akhoondi | H04L 67/303 |
| 10,764,434 B1* | 9/2020 | Yoskowitz | H04L 61/45 |
| 10,791,461 B1* | 9/2020 | Gailloux | H04W 12/06 |
| 11,303,606 B1* | 4/2022 | Chew | H04L 45/7453 |
| 11,418,483 B1* | 8/2022 | Cupp | H04L 63/0209 |
| 2002/0138622 A1* | 9/2002 | Dorenbosch | H04L 9/40 709/227 |
| 2003/0195956 A1* | 10/2003 | Bramhall | G06F 3/0601 707/E17.005 |
| 2003/0220977 A1* | 11/2003 | Malik | H04L 51/04 709/206 |
| 2005/0159883 A1* | 7/2005 | Humphries | B60R 25/33 340/995.21 |
| 2007/0256122 A1* | 11/2007 | Foo | H04L 63/1433 726/5 |
| 2008/0021997 A1* | 1/2008 | Hinton | H04L 63/0815 709/225 |
| 2008/0104046 A1* | 5/2008 | Singla | H04L 63/1408 |
| 2008/0137593 A1* | 6/2008 | Laudermilch | H04W 48/02 370/328 |
| 2009/0006501 A1* | 1/2009 | Bharadwaj | H04L 67/1097 |
| 2010/0325441 A1* | 12/2010 | Laurie | H04L 9/3257 713/185 |
| 2012/0065958 A1* | 3/2012 | Schurig | G06F 21/6218 704/E11.001 |
| 2013/0041761 A1* | 2/2013 | Voda | G06Q 30/0267 705/14.68 |
| 2013/0297501 A1* | 11/2013 | Monk | G06Q 20/405 705/40 |
| 2013/0297866 A1* | 11/2013 | Varghese | H04L 67/1097 711/108 |
| 2014/0117076 A1* | 5/2014 | Eberlein | G06F 16/9566 235/375 |
| 2014/0304519 A1* | 10/2014 | Gorecki | H04L 9/0825 713/176 |
| 2015/0071166 A1* | 3/2015 | Malhotra | H04W 48/18 370/328 |
| 2015/0084736 A1* | 3/2015 | Horton | H04B 5/0056 340/5.7 |
| 2015/0227732 A1* | 8/2015 | Doctor | G06F 21/31 726/4 |
| 2015/0269600 A1* | 9/2015 | Randle | G06Q 30/0211 705/14.14 |
| 2016/0021192 A1* | 1/2016 | Passichenko | H04L 63/08 713/168 |
| 2016/0127325 A1* | 5/2016 | Odenheimer | H04L 63/0407 713/168 |
| 2016/0134619 A1* | 5/2016 | Mikheev | H04W 4/60 726/8 |
| 2016/0149839 A1* | 5/2016 | Yi | H04L 51/04 709/206 |
| 2016/0203522 A1* | 7/2016 | Shiffert | G06Q 30/0267 705/14.58 |
| 2016/0316328 A1* | 10/2016 | Baran | H04W 4/50 |
| 2016/0335879 A1* | 11/2016 | Carr | G08B 27/005 |
| 2016/0345176 A1* | 11/2016 | DeWitt | H04W 4/029 |
| 2017/0017810 A1* | 1/2017 | Bolotin | G06F 21/6218 |
| 2017/0085497 A1* | 3/2017 | Park | H04L 45/745 |
| 2017/0228785 A1* | 8/2017 | Evje | G06Q 30/0275 |
| 2018/0115551 A1* | 4/2018 | Cole | H04L 47/783 |
| 2018/0240099 A1* | 8/2018 | Bester | H04L 9/0869 |
| 2018/0310142 A1* | 10/2018 | Samdani | H04L 51/046 |
| 2018/0352004 A1* | 12/2018 | Leung | H04L 63/00 |
| 2019/0043140 A1* | 2/2019 | Williams | H04W 4/021 |
| 2019/0090085 A1* | 3/2019 | Masterson | H04M 1/72457 |
| 2019/0095974 A1* | 3/2019 | Wong | H04L 63/06 |
| 2019/0102726 A1* | 4/2019 | Ushiki | H04W 4/022 |
| 2019/0104398 A1* | 4/2019 | Owen | H04L 41/22 |
| 2019/0197514 A1* | 6/2019 | Tineo | G06Q 20/4015 |
| 2019/0349338 A1* | 11/2019 | Frost | G06F 9/452 |
| 2020/0005415 A1* | 1/2020 | Schuler | G06Q 50/265 |
| 2020/0169400 A1* | 5/2020 | Thaler, III | G06F 21/602 |
| 2020/0244797 A1* | 7/2020 | Horelik | H04L 63/0407 |
| 2020/0258606 A1* | 8/2020 | Ferentz | G06Q 50/265 |
| 2021/0029000 A1* | 1/2021 | Mordani | H04L 41/08 |
| 2021/0141913 A1* | 5/2021 | Mosconi | G06F 21/6245 |
| 2021/0185521 A1* | 6/2021 | Purkayastha | H04W 76/25 |
| 2021/0211831 A1* | 7/2021 | Gan | G06N 20/00 |
| 2021/0218712 A1* | 7/2021 | Zhao | H04L 63/18 |
| 2021/0367975 A1* | 11/2021 | Wood | H04L 41/082 |
| 2021/0400423 A1* | 12/2021 | Udipi | H04W 4/023 |
| 2022/0232003 A1* | 7/2022 | Smolny | H04L 63/0853 |
| 2022/0239631 A1* | 7/2022 | Fu | H04L 63/0236 |
| 2022/0286507 A1* | 9/2022 | White | H04L 41/0893 |
| 2022/0337571 A1* | 10/2022 | Shafi | H04L 67/1004 |
| 2023/0070253 A1* | 3/2023 | Rajadurai | H04W 12/06 |

* cited by examiner

_500_

```
Maintain, by a first server system located in a first one of a plurality of network regions, an alias
map that specifies encoded versions of alias values that are in use across the plurality of network
                                           regions
                                             502
```

↓

```
Receive a first user-provided alias value from a first user during an account registration process
                                             504
```

↓

```
Determine whether the first user-provided alias value is already in use in any of the plurality of
                                       network regions
                                             506
```

↓

```
Determine that the first user-provided alias value is not already in
                 use within the first network region
                                508
```

↓

```
Generate a first encoded value based on the first user-provided
                         alias value
                            510
```

↓

```
Using the alias map, compare the first encoded value to the
encoded versions of the alias values that are in use across the
                plurality of network regions
                             512
```

```
Receive, by a first server system located in a first one of a plurality of network regions, a request
from a first user to perform a first operation with a second user, where the request includes an
alias value for the second user
1002
```

↓

```
Determine, based on the alias value, that the second user is not associated with the first network
region
1004
```

↓

```
Access an alias map that specifies encoded versions of alias values that are in use across the
plurality of network regions
1006
```

↓

```
Determine that the second user is associated with a second one of the plurality of network regions
1008
```

↓

```
Generate a first encoded value based on the alias value
1010
```

↓

```
Compare the first encoded value to the encoded versions of alias
values specified in the alias map
1012
```

↓

```
Determine that the first encoded value matches a second encoded
value in the alias map, where the second encoded value is
associated with an identifier for the second network region
1014
```

↓

```
Route a first communication corresponding to the request to a second server system that is
located in the second network region
1016
```

Receive, by a first server system located in a first one of a plurality of network regions, a request to perform a first operation, where the request includes an alias value with an embedded region identifier
1102

In response to the request, determine that a communication corresponding to the request is to be sent to a different one of the plurality of network regions
1104

Analyze the alias value to identify the embedded region identifier
1106

Based on the embedded region identifier, identify a second network region as the appropriate network region for the communication
1108

Send the communication corresponding to the request to a second server system that is located in the second network region
1110

FIG. 11

COMMUNICATION BETWEEN SERVER SYSTEMS IN DIFFERENT NETWORK REGIONS

CROSS-REFERENCE TO RELATED APPLICATIONS

This application claims benefit of priority to U.S. Provisional Patent Application Ser. No. 63/175,803, filed on Apr. 16, 2021, which is hereby incorporated by reference as if entirely set forth herein. This application is also related to U.S. patent application Ser. No. 17/134,350 filed on Jun. 30, 2021, which is hereby incorporated by reference as if entirely set forth herein.

TECHNICAL FIELD

This disclosure relates generally to computer networks, and more particularly to communicating between server systems located in different network regions of a computer network.

DESCRIPTION OF THE RELATED ART

Server computer systems, such as web servers, application servers, email servers, etc., may be used to provide various computing resources and services to users. For example, an organization may operate one or more computer systems to provide access to a web service to remote users via a network. In some instances, an organization may operate server systems in multiple different network regions such that the users of the web service are located in multiple different countries. In some instances, having a user-base that is distributed across multiple different countries, each with potentially different data localization requirements, may present various technical problems. For example, due to data localization requirements, an organization may distribute its users' data across server systems that are located in different network regions such that a server system in a first network region does not have access to the user data of users located in a second network region. In many instances, this sharding of user data may cause technical problems when establishing user alias values and when routing communications between server systems located in different network regions.

BRIEF DESCRIPTION OF THE DRAWINGS

FIGS. 5 and 6 are flow diagrams illustrating example methods for verifying whether an alias value is unique across different network regions, according to some embodiments.

FIG. 10 is a flow diagram illustrating an example method for routing communications between network regions using an alias map, according to some embodiments.

FIG. 11 is a flow diagram illustrating an example method for routing communications between network regions using an alias value with an embedded network identifier, according to some embodiments.

DETAILED DESCRIPTION

Figure 1:
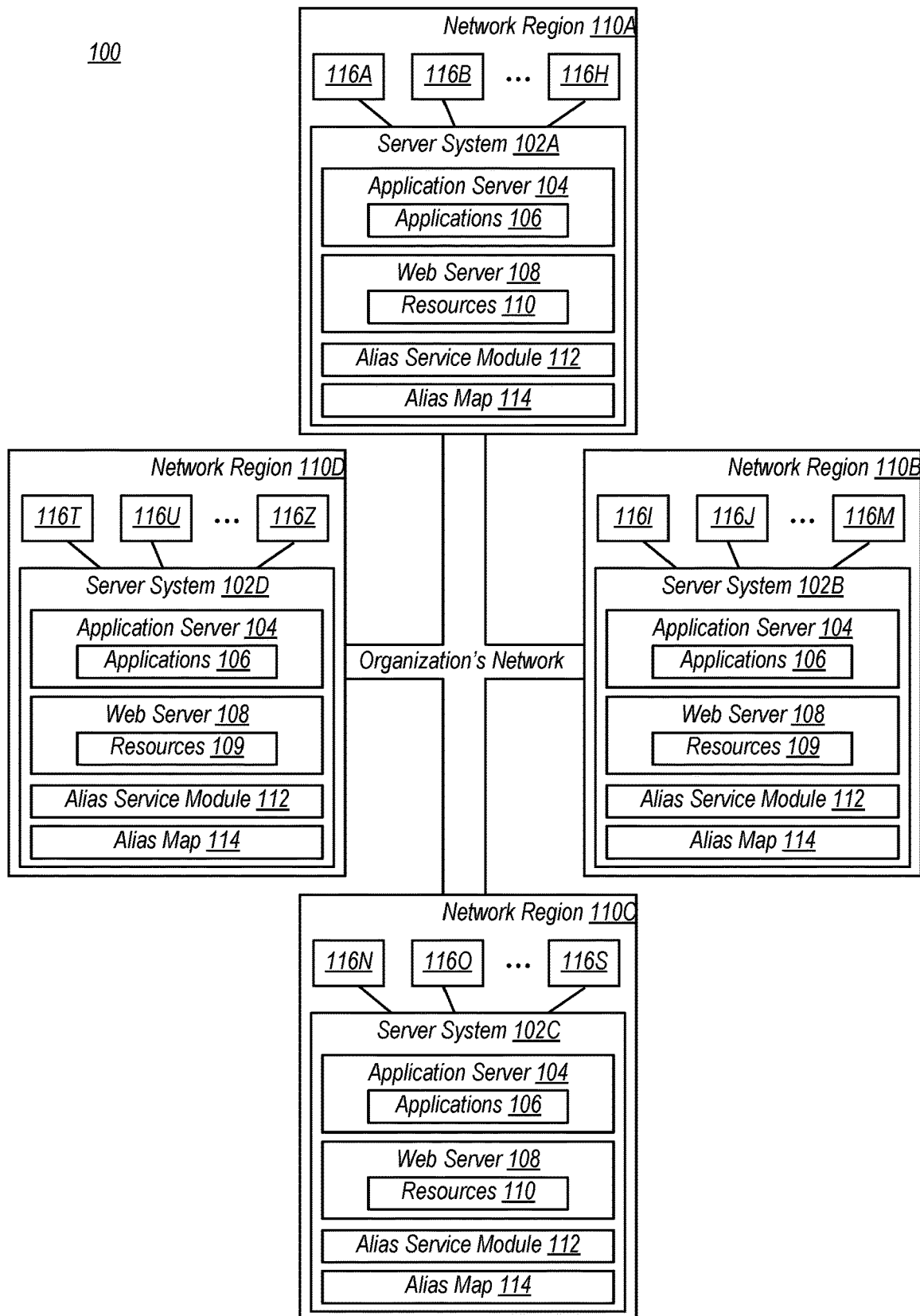
FIG. 1 is a block diagram illustrating an example computer network in which an organization operates server systems in multiple different network regions, according to some embodiments.

"Data localization requirements" refers generally to laws, regulations, and/or compliance requirements that govern the manner in which data about a nation's citizens or residents may be collected, processed, stored, and transferred. More specifically, data localization regulations typically require that data relating to a nation's citizens or residents be stored within the boundaries of that nation, and that such data may only be transferred out of those boundaries after complying with local data privacy or data protection laws. In some instances, a particular data localization law may apply to the citizens or residents of a single country (e.g., as is the case with various data localization laws in India and China) or for a set of countries (e.g., as with the European Union's General Data Protection Regulation ("GDPR")). With these new data localization requirements, organizations (e.g., providers of web services) are, or soon will be, required to store user data within the geographic region ("geo") in which the user resides. For example, data for users in India will need to be stored in India, data for users in China will need to be stored in China, data for users in Europe will need to be stored in Europe, etc. Accordingly, under these data localization requirements, an organization's user data will be sharded across the various geos in which the organization operates.

In many instances, a server system will utilize one or more identifier values (also referred to herein as "alias values" or simply "aliases") to identify a user of the service(s) that the server system provides. For example, a particular user may have multiple different aliases with a server system that may be used to identify that particular user. Some of these aliases may be provided to the server system by the user (e.g., a username, an email address, a phone number, etc.) while other aliases may be generated by the server system for the user (e.g., a user account number). Since these alias values are personally identifiable, many of the data localization requirements mandate that these values cannot be stored outside of a user's respective geo.

Data localization requirements may create various technical problems for organizations, and particularly for organizations that operate in multiple different geographic regions. For example, to comply with data localization requirements, the organization may distribute (e.g., shard) the storage of these alias values across the various geographic regions in which it operates. Consider, for instance, a situation in which Organization 1 provides a web service that is accessible to users located in both geographic region A and geographic region B. In this scenario, Organization 1 may store the alias values for users that reside within Region A only on systems located within Region A. Similarly, for the users that reside within Region B, Organization 1 may store the corresponding alias values only on systems located within Region B. One implication of this alias sharding is that the organization's system located in one geo will not have access to a list of identifiers that are in use by the organization's systems located in the other geos. This is particularly problematic while on-boarding users. During the account registration process, a new user may provide (or the organization may generate) one or more proposed alias values (e.g., an email address, phone number, username, etc.) for use with the service(s) the organization provides. As will be appreciated by one of skill in the art with the benefit of this disclosure, it is often important that the alias values in use within an organization uniquely identify the respective users, for example so that the server system performs requested operations for the appropriate user. In instances in which an organization shards its aliases values across the different geos to comply with data localization requirements, however, the organization is unable to verify that the proposed alias value(s) for the new user is not already in use in another geo.

In various embodiments, however, the disclosed techniques provide a technical solution to these or other technical problems. For example, in various embodiments, the disclosed techniques utilize an "alias map" that is distributed across an organization's various systems that are located in different network regions. In various embodiments, the alias map stores an encoded (e.g., hashed) version of a user's alias (e.g., email address) and an identifier of the network region with which the user is associated. When on-boarding a user, the organization's local system can first ensure that the user-provided alias is unique within its own network region and then, using the alias map, verify that the user-provided alias is also unique across the organization's systems located in the other network regions. Note that, by utilizing the alias map, the disclosed techniques enable a server system in a first network region to verify that a proposed alias value is unique across all of the other network regions in a manner that does not expose the alias values (e.g., in a plaintext or otherwise un-encoded format) that are in use in these other network regions to the server system, thereby complying with the various data localization regulations.

As used herein, the term "network region" refers to an area in which at least a portion of an organization's computer network is located. In some embodiments, a network region may coincide with a particular geographic region (e.g., a state or country) that is subject to the same data localization requirements. For example, in some such embodiments a "first network region" may correspond to the U.S., a "second network region" may correspond to India, a "third network region" may correspond to China, and a "fourth network region" may correspond to the set of countries that are members to the European Union. In some such embodiments, the disclosed techniques may be used to ensure alias values uniqueness and facilitate communication across network regions in a way that complies with the various applicable data localization regulations. Note, however, that this example is merely one non-limiting embodiment. In other embodiments, the demarcation of a network region may be independent of any applicable data localization regulations. For example, in some embodiments both a "first network region" and a "second network region" may be located within a single country (e.g., China) while a "third network region" may span multiple different countries (e.g., the U.S. and Canada).

As described in more detail below, various disclosed embodiments further include using internally generated alias values (e.g., account numbers, client IDs, etc.) that embed network identifiers within the alias values themselves, which may allow the system to identify a user's network region without resorting to the alias map, which may be desirable in some instances. In various embodiments, the disclosed techniques utilize the alias map and internally generated alias values to communicate between the organization's systems that are located in different network regions. For example, a system in a first network region (e.g., the United States) can use an alias map (or, in some instances, a network identifier embedded in an alias value) to determine the appropriate network region to route a request to (e.g., during an electronic transaction or user login) or to retrieve customer data from. The use of the alias map and the embedded network identifiers, in various embodiments, enables fast and efficient routing of communication between server systems located in different network regions in a way that complies with the various data localization regulations.

With reference to FIGS. 1-6, this disclosure initially describes various embodiments in which an alias map is used to verify that an alias value is unique across various different network regions. Then, with reference to FIGS. 7-12, this disclosure describes various embodiments in which an alias map and network identifiers embedded in alias values may be used to facilitate the efficient routing of data between server systems located in different network regions.

Unique Identifier Values Across Separate Network Regions

Referring now to FIG. 1, block diagram 100 depicts an example embodiment in which an organization operates server systems 102 in multiple different network regions 110. In the non-limiting embodiment of FIG. 1, the organization operates server system 102A in network region 110A (e.g., the U.S.), server system 102B in network region 110B (e.g., India), server system 102C in network region 110C (e.g., China), and server system 102D in network region 110D (e.g., Europe). Note, however, that this embodiment is provided merely as one non-limiting example and, in other embodiments, an organization may operate server systems 102 in additional, fewer, or different network regions 110 than those shown in FIG. 1. Further, in various embodiments, an organization may operate multiple server systems 102 within a single network region 110.

In various embodiments, the organization may provide a service (e.g., a web service) that is utilized by users located in many different network regions (e.g., different countries). For example, in various embodiments, the server systems 102 may provide one or more computing resources (e.g., as part of a web service) that may be used directly by users (e.g., via a user device) or that may be integrated with (or otherwise used by) web services provided by third parties. As one non-limiting example, server systems 102, in some embodiments, provide an online payment service that may be used by users to perform online financial transactions (e.g., sending or receiving funds) or utilized by merchants to receive funds from users during financial transactions. Note, however, that this embodiment is described merely as one non-limiting example. In other embodiments, server system 102 may provide any of various suitable web services to users, such as an email service, streaming media service, social media service, online retail store, etc. Additionally note that, in some embodiments, a "server system" (such as server system 102, application server 104, or web server 108) may be implemented using a single machine. In other embodiments, however, a "server system" may be implemented using multiple machines executing (e.g., at one or more datacenters) for the benefit of a single entity (e.g., the organization). For example, in some embodiments, server system 102A may be implemented using multiple machines located at one or more datacenters within a network region 110A.

In the depicted embodiment, the organization uses the server systems 102 to provide one or more web services to users 116 that are located across the various network regions 110 and, as such, the organization may be said to have a global user base. As noted above, various data privacy and data localization regulations are being (or have been) implemented that require an organization to store a user's data within the geographic region in which the user resides, creating the need to split an organization's system into multiple nodes (e.g., server systems 102) working together. In this situation, the individual nodes may only store data for a subset of the organization's user base. For example, the server system 102A may maintain data for users 106A-106H that are associated with network region 110A, in which the server system 102A is located. A similar approach may be taken with regard to server systems 102B-102D located in network regions 110B-110D, respectively. So, even though an organization may be said to logically have one global user base, to comply with the data localization requirements the organization may utilize server systems 102 that have access to data for one subset of users but do not have access to data for other subsets of users that are located in different network regions 110.

Note that, in various embodiments, a server system 102 has access to the alias values for the users 116 that are associated with the network region 110 in which that server system 102 is located. For example, server system 102A, in various embodiments, has access to (that is, the ability to obtain or make use of) the alias values for the users 116A-116H that are associated with network region 110A in which the server system 102A is located. In some non-limiting embodiments, a server system 102 may store the local alias values either in a plaintext format or in an encrypted format using one or more cryptographic keys that are available within the computing environment of the server system 102 such that the plaintext (or otherwise un-encoded) versions of these local alias values 402 may be accessed within that server system 102 when needed (e.g., when determining whether a proposed alias value is unique within the local network region 110). Further note that, to comply with data localization requirements, a server system 102 does not have access to the alias values for users 116 that are associated with network regions 110 other than the one in which that server system 102 is located, according to various embodiments. For example, server system 102A, in various embodiments, does not have access to the alias values for the users 116I-116Z that are associated with the other network regions 110B-110D. Continuing with this example, in some embodiments the server system 102A may not have access to the user data (including alias values) for users 116I-116Z because such data is stored on data stores that are physically separate from server system 102A and from which the server system 102A cannot directly access data. In one such embodiment, for example, the alias values for users 116I-116M may be stored using one or more of server system 102B's internal data stores that are not accessible to outside systems, including server system 102A.

In other embodiments, server system 102A may be unable to access the user data (including alias values) for users 116I-116Z due to a set of permissions granted to the server system 102A. For example, consider an embodiment in which the server systems 102 utilize a third-party data storage service (e.g., a cloud-based data storage service) to store some or all of the users 116 data. In such an embodiment, each of the server systems 102A-102D may have its own set of permissions with this third-party data storage service that dictate the data to which the respective server systems 102 have access. In some such embodiments, these permissions may be established such that the server systems 102 do not have access to the user data for users 116 that are associated with other network regions 110, even though this user data may be stored using the same underlying physical data stores. For example, server system 102A, in such an embodiment, may have permission to access user data (including alias values) associated with users 116A-116H but not to access user data (including alias values) associated with users 116I-116Z.

In various embodiments, an organization may utilize alias values that fall within one of two broad categories: user-provided alias values and internally generated (e.g., by the server system 102) alias values. As noted above, user-provided alias values may include identifiers such as email addresses, usernames, phone numbers, etc. The server system 102 may use these alias values at various points while providing the services to the users. For example, alias values may be used in application programming interface ("API") calls from a partner service to the server system 102, in user requests (e.g., a request to transfer funds to a user account with a particular alias value, such as an email address), during login operations, etc. When a user registers an account with an organization, the organization typically wants to ensure that the user-provided alias value(s) for the new user account are not already being used by another user. With the data localization requirements, however, the organization's user data becomes siloed across the different network regions, causing technical problems for the organization. For example, the server system 102 in a given network region 110 is unable to store a list of all of the alias values that are in use in each of the different network regions 110, making it difficult or impossible for the server system 102 to determine whether a proposed user-provided alias value (e.g., for an account in the U.S.) is already in use in another network region 110 (e.g., for an account in China). Thus, in various embodiments, the data localization requirements create a technical problem for organizations in the situation in which an organization needs to know, without sharing protected user data between different network regions 110, whether a given alias value is already in use by another user (e.g., in another network region 110) and, if so, in what network region 110 the alias value is being used.

In FIG. 1, each server system 102 includes an instance of an alias service module 112 and a local copy of an alias map 114. In various embodiments the alias service module 112 provides an internal service within a server system 102 that is usable (e.g., by various applications 106) to interact with an alias map 114 that stores encoded versions of alias values that are in use across the various network regions 110. For example, in some embodiments, the applications 106 may interact with the alias service module 112 via one or more API endpoints (e.g., representational state transfer ("REST")

API endpoints, GraphQL API endpoints, etc.) that are exposed to the applications 106 within the server system 102 and to which the applications 106 may send one or more API calls to perform various operations associated with the alias map 114. In various embodiments, the disclosed techniques utilize an alias map 114 to address the technical problems discussed above. For example, in various embodiments the alias map 114 is used to store, for a given alias value, an encoded version of the alias value and an identifier of the corresponding network region 110 in which that alias value is being used.

Note that, in various embodiments, the encoded versions of the alias values no longer contain identifying information about the alias value itself or the user 116 with which the alias value is associated. In various embodiments, the disclosed techniques include generating the alias values for the alias map 114 utilizing a one-way function (e.g., a cryptographic hash function) such that it is impractical or infeasible to recover the plaintext version of an alias value given the encoded version thereof. Consider, as one non-limiting example, an embodiment in which the server system 102 (e.g., via alias service module 112) uses a hash function (e.g., MD5) to generate the encoded version of an alias value. As will be appreciated by one of skill in the art, performing such an encoding operation (e.g., using a hash function) maps the input alias value to an encoded value (a hash value, in the current example) that does not contain identifying information about the alias value itself. Accordingly, by using the alias map 114 to store an encoded version of the user 116's alias value and an identifier for their associated network region 110, the organization is able to comply with applicable data localization requirements since there is no sensitive user information being shared outside of the network region 110 in which a user resides.

Consider, for example, an instance in which user 116A in network region 110A uses the following alias value with server system 102A: user@example.com. In such an embodiment, when the user 116A creates the account (or otherwise establishes this alias value) with server system 102A, the alias service module 112 may create an entry for this alias in the local copy of the alias map 114. More specifically, the alias service module 112 may create an encoded version of the alias value (e.g., using a cryptographic hash function) and store this encoded version of the alias, along with an identifier for network region 110A, in the alias map 114. This change to the alias map 114 may then be replicated to the copies of the alias map 114 that are maintained in the other network regions 110B-110D, as described in more detail below with reference to FIGS. 3A-3B. Continuing with the current example, if, after user 116A has created an account with the organization, a new user in network region 110C attempts to create an account with the same alias value (e.g., "user@example.com"), the server system 102C may determine (e.g., via alias service module 112) whether that proposed alias value is already in use, both locally and across the other network regions 110A, 110B, and 110D.

To determine whether the proposed alias value is already in use locally, the server system 102C may compare the provided alias value to a set of local alias values that are in use within network region 110C, as server system 102C may access these alias values without violating data localization requirements. To determine whether the proposed alias value is already in use in one of the other network regions 110, the server system 102C may use the alias map 114, which, in various embodiments, includes a list of encoded alias values, and their corresponding network region 110, that are in use across all of the network regions 110. More specifically, the server system 102C may encode the proposed alias value (e.g., using the same encoding algorithm that is used when populating the alias map 114) and then compare this encoded value to the encoded values in the alias map 114. If there is a match, the server system 102C may determine that the proposed alias value (e.g., "user@example.com") is already in use and, if desired, may determine the network region 110 with which the existing user 116 is associated (e.g., the network region 110 in which the existing user currently resides or resided at the time the alias value was registered with the alias map 114). In such an instance, the server system 102C may inform the new user that the proposed alias value is unavailable and require the new user to provide a different alias value.

Note that a user 116 may have multiple alias values (e.g., email address, username, phone number, account number, etc.) with the organization. In various embodiments, the disclosed techniques may be used to record multiple different alias values for a user 116 in the alias map 114. For example, a user 116A may have an email address alias value (e.g., "user@example.com") and a phone number alias value (123-456-7890) with an organization, potentially in addition to one or more other user-provided or internally generated alias values. Using the disclosed techniques, both of these alias values may be separately registered with the alias map 114, as described herein. For example, the server system 102 may generate an encoded version of the email address and store it, along with an identifier of the user 116A's network region 110A, in the alias map 114 and, separately, generate an encoded version of the phone number and store that encoded value, along with an identifier of the user 116A's network region 110A, in the alias map 114. In the current example, note that, even though both of these alias values for the user 116 would be associated with the same network region 110A, in various embodiments the alias map 116 provides no indication that these two alias value belong to the same user 116.

As noted above, the disclosed alias map 114 may be used in various contexts, including during on-boarding to avoid having the same alias values for different users, and to accurately identify the users 116 while performing computational operations offered via the service(s) a server system 102 provides. For example, consider an instance in which user 116A in network region 110A is using an online payment service provided by the server systems 102 to send funds to user 116Z in network region 110D. In this instance, the server system 102A may need information about the user 116Z, such as the network region 110 to which the user belongs, to perform this transaction. In various embodiments, using the alias map 114, the server system 102A can determine that user 116Z is associated with network region 110D and can send information corresponding to the requested transaction to the server system 102D, which may then complete the requested transaction. In this non-limiting example, the server system 102A in network region 110A is able to use the alias map 114 to determine the network region 110D with which the user 116Z is associated without having access to any personal information about that user 116Z, which is instead stored (e.g., by server system 102D) in network region 110D.

In various embodiments, the disclosed techniques provide various technical benefits. For example, as described above, the disclosed techniques include encoding the alias values and distributing those encoded values as a key in the alias map 114, creating a globally distributable mapping of alias values to their respective network region 110 without leaking the details of the alias values (e.g., the plaintext version) to the server systems 102 in the other network regions 110. For example, using the disclosed alias map 114, an organization is able to determine (e.g., during creation of a user account) whether an alias value (user-provided or internally generated) is unique relative to all of the alias values in use across all of the network regions 110, while doing so without sharing the actual details of those alias values across all of the different network regions 110, complying with data localization requirements.

Figure 2:
FIG. 2 is a block diagram illustrating an example alias map, according to some embodiments.

Referring now to FIG. 2, diagram 200 depicts a non-limiting example of a portion of an alias map 114, according to some embodiments. In the depicted embodiment, the alias map 114 includes two fields: an alias 202 field and a region identifier 204 field. Note, however, that in various embodiments an alias map 114 may include additional fields, as desired. Further note that, although depicted as a table in FIG. 2, alias map 114 may be implemented using any of various suitable data structures (e.g., a database index, a hash table, etc.), according to various embodiments.

In FIG. 2, alias map 114 includes six entries corresponding to six example alias values that are in use within an organization across the various network regions 110. Alias map 114 of FIG. 2 continues with the non-limiting example introduced above with reference to FIG. 1 in which an organization operates server systems 102A-102D in four different network regions 110A-110D, respectively. In this non-limiting embodiment, the network regions 110 are represented using region identifiers 204 as follows: network region 110A is represented by "00," network region 110B is represented by "01," network region 110C is represented by "10," and network region 110D is represented by "11." Note, however, that this example is provided merely as one non-limiting example and, in other embodiments, various other suitable identifier values may be used to represent the various network regions 110. Further note that although only six entries are included in the alias map 114 depicted in FIG. 2, this simplified example is provided merely for illustration and, in various embodiments, alias map 114 may include entries for any suitable number of alias values. For example, in some embodiments a server system 102 may have a large number of users (e.g., hundreds of thousands, millions, etc.), each of which may have multiple different alias values stored in the alias map 114. Accordingly, in some such embodiments, the alias map 114 may also include a large number of entries (e.g., millions, tens of millions, etc.) corresponding to these alias values.

As noted above, in various embodiments the applications 106 hosted within a server system 102 may use the alias service module 112 (not separately shown in FIG. 2, for clarity) to interact with the alias map 114. For example, when checking whether a particular user-provided alias value is already taken during an account registration process, an application 106 may send an API request specifying the proposed user-provided alias value to alias service module 112. The alias service module 112 may then generate an encoded version of that alias value and query the alias map 114. If a match is found, the alias service module 112 may send back a notification that the proposed user-provided alias value is not available (optionally with an indication of the network region 110 in which the alias value is already in use). If, however, the proposed user-provided alias value is not found in the alias map 114, the alias service module 112 may send back a notification that the proposed user-provided alias value is available.

Additionally, in some embodiments, the alias service module 112 may be used to add or delete an entry for an alias value in the alias map 114. For example, in some embodiments, once an alias value (either user-provided or internally generated) has been determined to be unique across the various network regions 110, an application 106 may send an API request to the alias service module 112 to add an entry corresponding to the alias value to the alias map 114. In such an embodiment, the alias service module 112 may generate an encoded version of this alias value and create an entry in the alias map 114 for this alias value. Once this new entry is created, the alias service module 112 may store the encoded version of the alias value (e.g., an encoded value 203) in the alias 202 field and an identifier for the network region 110 with which the user 116 is associated in the region identifier 204 field. Note that, in various embodiments, a user 116 is said to be "associated with" a particular network region 110 if the user resides in a location (e.g., a country) that is covered by that network region 110. For example, consider an embodiment in which network region 110A corresponds to the U.S. and a user 116A resides in the U.S. In this non-limiting example, user 116A may be said to be associated with network region 110A. Further note that, in various embodiments, an alias value is initially associated, in the alias map 114,) with the network region 110 with which the corresponding user 116 is associated. For example, if a user-provided alias value is created by a user 116A associated with (e.g., residing in) network region 110A, that alias value may be associated with the network region 110A in the alias map 114. This convention may also be applied for internally generated alias values, according to various embodiments. For example, in some embodiments, an internally generated alias value may be associated (e.g., in the alias map 114) with the same network region 110 as the user 116 for whom the alias value was generated. Note that, in various embodiments, the network region 110 with which a user 116 is associated may change. For example, user 116A may move from one country covered by network region 110A to another country covered by network region 110B and, as such, user 116A may now be said to be associated with network region 110B, according to some embodiments. In some such embodiments, the disclosed techniques include updating the alias map 114 such that the entries for alias values associated with user 116A accurately indicate the network region 110B with which the user 116A currently associated. Accordingly, in various embodiments, the region identifier 204 for an alias value may be updated as needed, for example if a user 116 relocates from one network region 110 to another.

Further, in various embodiments, the alias map 114 may be used to determine the network region 110 with which a given alias value is associated. For example, as described in more detail below with reference to FIGS. 7-12, in various embodiments the disclosed techniques may be used to route communications between server systems 102 located in different network regions 110. In some such embodiments, this routing may be performed by utilizing the alias map 114 to determine the appropriate network region 110 to which to route a given communication (e.g., based on a provided alias value). In some embodiments, an application 106 may send a call to the alias service module 112 with a given alias value (either in encoded or plaintext format), which the alias service module 112 may use as a key to search the alias map 114 to determine the network region 110 (if any) with which the given alias value is associated.

As noted above, in some embodiments the disclosed techniques include utilizing internally generated alias values that embed network identifiers within the alias values themselves. Non-limiting examples of such internally generated alias values include account numbers for user accounts, API credentials for third-party partner services, client IDs for client applications, etc. In various embodiments, a server system 102 may create an internally generated alias value (e.g., an account number) by appending a network identifier to one or more additional values. According to some embodiments, one non-limiting example of an internally generated alias value is an account number that includes a network identifier value concatenated with another value (e.g., a random or pseudo-random numerical value) to generate an account number for a given user account (optionally concatenated with one or more additional values). In one non-limiting embodiment, an account number may be a 64-bit value formatted as follows: |64th-bit unset|2-bit Version Id|5-bit network identifier|2-bit multi-master identifier|54-bit random UUID|. Note, however, that this embodiment is provided merely as one non-limiting example and, in other embodiments, an account number may include additional, fewer, or different fields than shown in this example embodiment.

Consider, as an example, embodiments in which the server system 102 generates account numbers (or other internally generated alias values) that consist (at least) of a random or pseudo-random value concatenated with a network identifier. In such embodiments, the server system 102 (e.g., via the alias service module 112) may first generate the random or pseudo-random value and verify that this value is not already in use in an alias value within its local network region 110. In some embodiments, if the server system 102 determines that this random or pseudo-random value is unique within the network region 110, it may then safely generate the account number (or other alias value) by concatenating this value with the network identifier because, if the random or pseudo-random value is unique locally, it will necessarily be unique across all network regions 110 when the server system appends the network identifier for the local network region 110.

In various embodiments, the alias map 114 may be used to record both internally generated alias values (e.g., account numbers, client IDs, etc.) and user-provided alias values (e.g., usernames, email addresses, etc.). In many instances, however, it may be unnecessary for the internally generated alias values to be registered in the alias map 114. For example, in various embodiments, the server system 102 that generates an internally generated alias value may include its corresponding region identifier within the alias value. For example, internally generated alias values generated by server system 102A may include a region identifier for network region 110A, internally generated alias values generated by server system 102B may include a region identifier for network region 110B, etc. Accordingly, the region identifier in an internally generated alias value may, by default, identify the network region 110 in which the alias value was generated. In such embodiments, as long as the user 116 still resides within that network region 110, it may be unnecessary to register the internally generated alias values (with the network identifiers) in the alias map 114 since the user's network region will be apparent from the internally generated alias value itself. Accordingly, in some embodiments, the default assumption is that an internally generated alias value is associated with the network region indicated by its network identifier.

Embedding a region identifier into an alias value may provide various technical benefits. For example, using such a technique, one may be able to determine which network region 110 an internally generated alias value is associated with by visually inspecting the alias value. Consider, as a non-limiting example, the embodiment described above in which the following region identifiers are used: the value "00" is used to refer to network region 110A, the value "01" is used to refer to network region 110B, the value "10" is used to refer to network region 110C, and the value "11" is used to refer to network region 110D. In this non-limiting example, the network region 110 with which an alias value is associated may be determined simply by inspecting the appropriate digits in the alias value. In an embodiment in which an account number includes a network identifier as the first two digits followed by a four digit random number, as one non-limiting example, one could determine that the account number "001234" is associated with network region 110A.

This attribute may provide technical benefits in various situations, including enabling the efficient routing of requests between the various network regions 110, as described in greater detail below. For example, in an instance in which a server system 102 receives a request (e.g., from an user, an API request from a third-party partner, etc.) that includes a user 116's alias value with an embedded network identifier, the server system 102 may determine the appropriate network region 110 to route that request for processing simply by examining the network identifier field in the alias value. In some embodiments, the server system 102 may perform this routing utilizing both the alias map 114 and the embedded network identifier in an alias value. For example, in some embodiments, when the server system 102 receives a request that specifies an alias value with an embedded network identifier, it may first create an encoded version of the alias value and consult the alias map 114 to determine whether that alias value is explicitly registered with a particular network region 110. If so, the server system 102 may route that request to the corresponding server system 102 in the appropriate network region 110. If that alias value is not registered in the alias map 114, however, the server system 102 may then analyze the alias value to determine, based on the network identifier embedded therein, the appropriate network region 110 to route the request.

In some instances, however, it may be desirable to record an internally generated alias value, having an embedded network identifier, in the alias map 114. For example, consider an instance in which a user, e.g., user 116B, creates a user account with the organization depicted in FIG. 1 while residing in network region 110A. In this scenario, server system 102A may generate an account number (e.g., "001234") for the user 116B, where the account number includes an identifier ("00," in the current example) for network region 110A. If user 116B subsequently moves, e.g., to network region 110C, the network identifier included in the user 116B's account number no longer accurately indicates the network region 110 in which the user 116B resides. One potential approach to address this problem is to generate a new account number for the user 116B that accurately reflects the user 116B's current network region 110. This approach presents various technical problems, however, making it undesirable to change a user 116's established alias value. For instance, once an alias value has been generated for a user 116, the server system 102 may use that alias value to store data on behalf of the user 116 (e.g., as a key used to store user data within one or more data stores in the server system 102). In such an instance, changing the alias value for the user 116B may require multiple downstream changes to be made to the various data stores in the server system 102, costing time and computational resources.

To address this technical problem, in various embodiments the disclosed techniques may record the internally generated alias value in the alias map 114 such that the alias map 114 correctly indicates the network region 110 in which the user 116B now resides. Continuing with the example above, once the user moves to network region 110C, the server system 102 (e.g., server system 102A or 102C) may register the user 116B's account number in the alias map 114 by generating an encoded version of the account number (e.g., encoded value 203F) and storing this encoded value, along with an identifier for the network region 110C (e.g., "10"), in the alias map 114. In various embodiments, doing so may enable the organization's various server systems 102 to correctly determine the network region 110 in which the user 116B resides using the alias map 114 even though the network identifier in the user 116B's account number no longer accurately reflects his or her current network region 110.

Figure 3A:
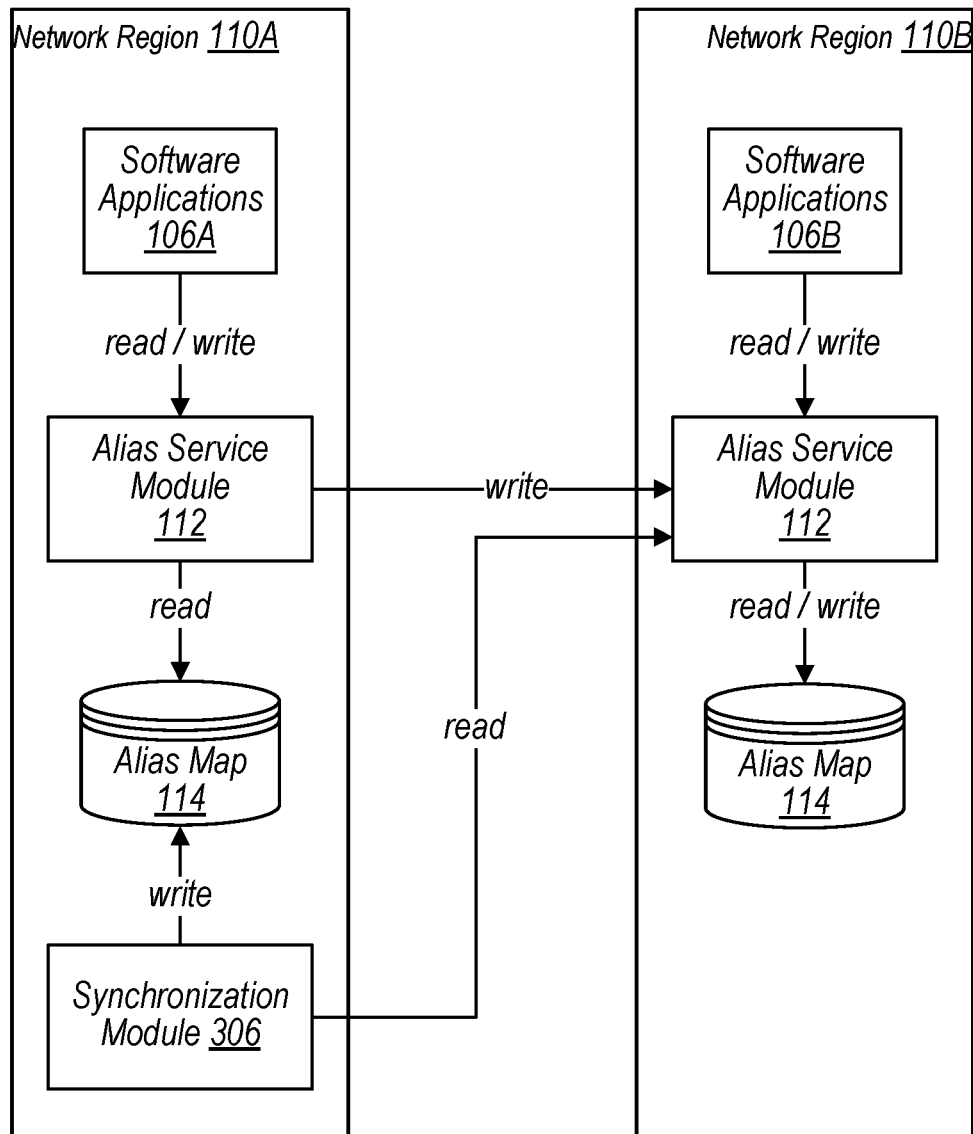
FIGS. 3A-3B are block diagrams respectively illustrating example active-passive and active-active data replication techniques that may be used to replicate changes to an alias map to various server systems, according to some embodiments.
Figure 3B:
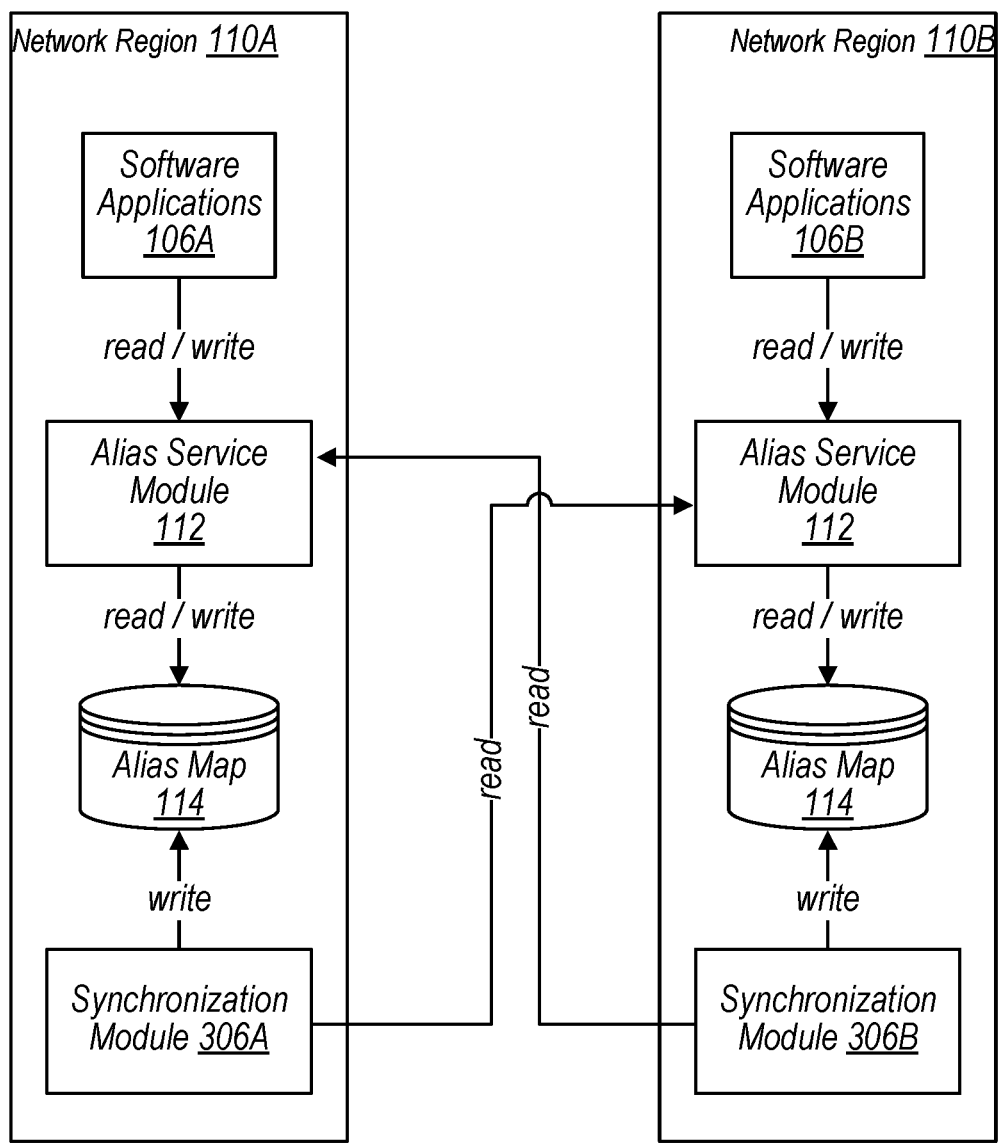

As noted above, alias map 114 may be replicated across the various network regions 110 such that an updated version of the alias map 114 is available locally to each of the various server systems 102A-D. FIGS. 3A-3B depict two example replication techniques that may be used to replicate changes to the alias map 114 across the various network regions 110. In FIG. 3A, for example, block diagram 300 depicts one non-limiting example of an active-passive replication technique that may be used to replicate changes to a local copy of the alias map 114 to the copies of the alias map 114 maintained at the other network regions 110. For example, in the depicted embodiment, block diagram 300 depicts two network regions 110: network region 110A (e.g., India, in the current example) on the left side of the diagram and network region 110B (e.g., the U.S., in the current example) on the right side of the diagram. In this embodiment, when applications 106 in the network region 110A make changes to the local copy of the alias map 114 (e.g., using the alias service module 112), those changes are first written to the copy of the alias map 114 maintained in network region 110B. As shown in FIG. 3A, the network region 110A includes a synchronization module 306 (e.g., a daemon) that is operable to read from the copy of the alias map 114 maintained in network region 110B and then write those changes to the copy of the alias map 114 maintained in the network region 110A. In various embodiments, this active-passive replication technique may be used to publish changes to the alias map 114 to the copies of the alias map 114 maintained by the other network regions 110.

In FIG. 3B, block diagram 350 depicts a non-limiting example of an active-active replication technique in which the server systems 102 in both network region 110A and network region 110B include synchronization modules 306 that are operable to read from the other network regions 110's alias map 114 and update their local copy of the alias map 114 accordingly. In various embodiments, either the active-passive replication technique depicted in FIG. 3A or the active-active replication technique depicted in FIG. 3B may be used to synchronize the alias map 114 across the various network regions 110 so that there is an up-to-date copy of the alias map 114 available to the server systems 102 in each network region 110. Note that, although only two network regions 110 are depicted in FIGS. 3A-3B for clarity, the disclosed active-passive and active-active replication techniques may be used to replicate the alias map 114 across any suitable number of network regions 110, as desired.

Figure 4:
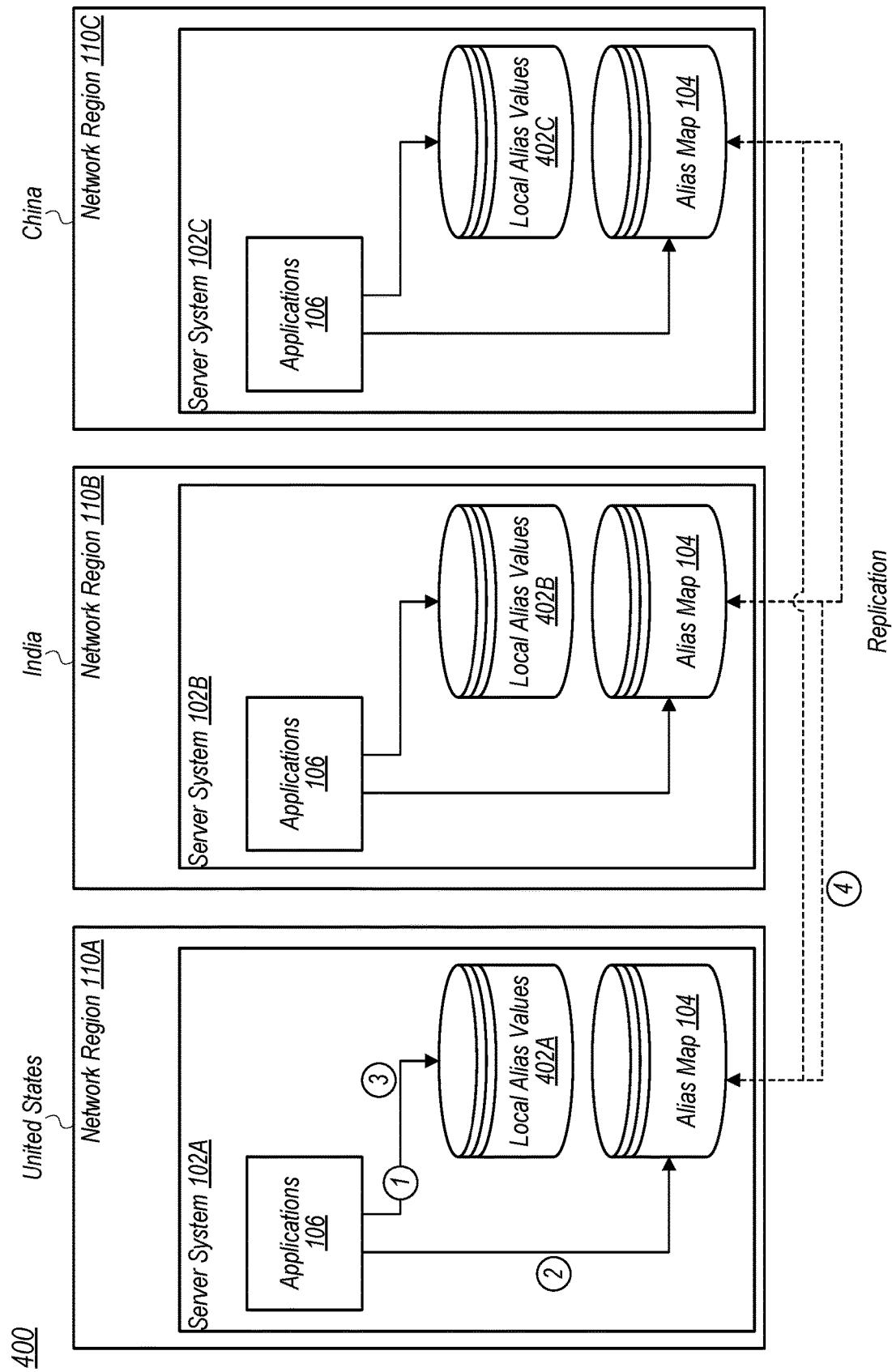
FIG. 4 is a block diagram illustrating an example system in which an alias map is used to manage alias value uniqueness across different network regions, according to some embodiments.

Referring now to FIG. 4, block diagram 400 depicts server systems 102 located in three different network regions 110 that utilize the disclosed alias map 114 to manage alias value uniqueness across the various network regions 110, according to some non-limiting embodiments. In the depicted embodiment, server system 102A is located in network region 110A (e.g., the U.S), server system 102B is located in network region 110B (e.g., India), and server system 102C is located in network region 110C (e.g., China). In various embodiments, the server systems 102 in each of these network regions 110 may maintain a local copy of the alias map 114, which, as noted above, stores a list of encoded alias values and corresponding network identifiers to ensure alias uniqueness (e.g., during user on-boarding).

For example, when creating a user account in the U.S., the server system 102A (e.g., via alias service module 112) first checks to determine whether a proposed alias value (e.g., internally generated or user-provided) is already in use locally. Note that, in FIG. 4, each of the server systems 102 has access to a set of local alias values 402, which specifies the alias values that are in use within that network region 110. Local alias values 402A, for example, includes those alias values that are in use for users 116 associated with network region 110A. In various embodiments, the local alias values 402 are accessible to the server system 102 located in that network region 110. For example, in some embodiments, these local alias values 402 may be stored in a plaintext format that may be directly inspected by the server system 102 (e.g., via the alias service module 112) in that network region 110. In other embodiments, the server system 102 may store these local alias values 402 in an encrypted format using a cryptographic key that is available within the computing environment of the server system 102 such that the plaintext versions of these local alias values 402 may be accessed within that server system 102 (e.g., by alias service module 112) while still securing the local alias values 402 while they are being stored.

In the embodiment of FIG. 4, the server system 102A may determine whether a proposed alias value is already in use locally by searching the local alias values 402A. If the proposed alias value is not found locally, the server system 102A may next attempt to reserve the proposed alias value in the alias map 114, for example by sending a call to alias service module 112 with the proposed alias value. If this reservation is successful, indicating that the alias isn't currently in use in any of the network regions 110, then the proposed alias value is registered locally in the local copy of the alias map 114. Once registered with the local copy of the alias map 114, this change may be replicated to the copies of the alias map 114 stored in the other network regions 110B-110C, for example using either the active-active or active-passive replication schemes discussed above.

Referring now to FIG. 5, a flow diagram illustrating an example method 500 for verifying whether an alias value is unique across different network regions is depicted, according to some embodiments. In various embodiments, method 500 may be performed by server system 102A of FIG. 1 to determine whether a proposed alias value provided by a prospective user is unique across the various network regions 110A-110D. For example, server system 102A may include (or have access to) a non-transitory, computer-readable medium having program instructions stored thereon that are executable by the server system 102A to cause the operations described with reference to FIG. 5. In FIG. 5, method 500 includes elements 502-510. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, a first server system located in a first one of a plurality of network regions maintains an alias map that specifies encoded versions of alias values that are in use across the plurality of network regions. For example, as described above with reference to FIGS. 1 and 2, the various server systems 102 of an organization may maintain an alias map 114 that includes a mapping between alias values that are in use, across the organization, and corresponding identifiers for the network region 110 in which a given alias value is in use. As noted above, in some embodiments the first server system 102A does not have access to a subset of alias values that are associated with users associated with one or more of the plurality of network regions. As described above, in various embodiments this may be done to comply with various data localization requirements or policies that may be in force for the organization. For example, in various embodiments the first server system 102A does not have access to plaintext versions of alias values associated with users 106I-106Z who are associated with network regions 110B-110D. In some embodiments, for a given alias value, the alias map specifies a corresponding encoded version of the given alias value and an identifier for a given one of the plurality of network regions with which the given alias value is associated. With reference to the non-limiting embodiment depicted in FIG. 2, for example, the first row in alias map 114 includes an encoded alias value of "sndqt34u89dz" and a corresponding region identifier 204 of "10," which, in this non-limiting example, refers to network region 110C.

At 504, in the illustrated embodiment, the first server system receives a first user-provided alias value from a first user during an account registration process. For example, in some embodiments the server system 102A may receive, from a prospective user of a service provided via the server system 102A, a proposed alias value (e.g., an email address, phone number, username, etc.) while the prospective user is attempting to register for an account with the service.

At 506, in the illustrated embodiment, the first server system determines whether the first user-provided alias value is already in use in any of the plurality of network regions. In the depicted embodiment, element 506 includes sub-elements 508-510. Note, however, that this embodiment is depicted merely as one non-limiting example and, in other embodiments, element 506 may include additional, fewer, or different sub-elements.

At 508, in the illustrated embodiment, the first server system determines that the first user-provided alias value is not already in use within the first network region 110A. For example, as discussed above, in various embodiments the server system 102A has access to a set of local alias values 402A that are in use within its network region 110A. In some such embodiments, these local alias values 402A may be stored in a plaintext format that may be directly inspected (e.g., by the alias service module 112). In other embodiments, the server system 102A may store these local alias values 402A in an encrypted format using a cryptographic key that is available within the computing environment of server system 102A such that the plaintext versions of these local alias values 402A may still be accessed within server system 102A (e.g., by alias service module 112). In various embodiments, the server system 102A may compare the first user-provided alias value to the set of local alias values 402A to determine if there is a match. If a match is detected, the server system 102A may determine that the first user-provided alias value is already in use (e.g., by an existing user 116) within first network region 110A. If no match is detected, as in the depicted embodiment, the server system 102A may determine that the first user-provided alias value is not already in use within the first network region 110A.

At 510, in the illustrated embodiment, the first server system generates a first encoded value based on the first user-provided alias value. For example, in various embodiments the alias service module 112 may generate a first encoded value based on this first user-provided alias value using any of various suitable encoding techniques. Non-limiting examples of encoding techniques that may be used to generate the first encoded value include SHA-256, SHA-3, bcrypt, or any other suitable encoding technique. At 512, in the illustrated embodiment, the first server system, using the alias map, compares the first encoded value to the encoded versions of the alias values that are in use across the plurality of network regions. For example, alias service module 112 may compare the encoded version of the first user-provided alias value to the encoded alias values specified in the alias map 114 to determine whether there is a match. In response to determining that the first user-provided alias value is already in use in a second one of the plurality of network regions, method 500 may include sending a request to the first user to provide an alternate user-provided alias value. In response to determining that the first user-provided alias value is not already in use, however, the first server system 102A may create an entry, in the alias map 114, corresponding to the first user-provided alias value. For example, in some embodiments creating this entry may include storing the first encoded value and a corresponding identifier for the first network region 110A in the alias map 114. In some such embodiments, the first encoded value may be a hash value generated based on the first user-provided alias value.

As discussed above with reference to FIGS. 3A-3B, in various embodiments the alias map 114, and changes thereto, are replicated across the various network regions 110. For example, in some embodiments, method 500 may further include initiating replication of the entry corresponding to the first user-provided alias value to copies of the alias map 114 stored at other server systems 102B-102D in the plurality of network regions 110B-110D. In some embodiments, this may include initiating an active-passive replication operation between the first server system 102A and the other server systems 102B-D (as described above with reference to FIG. 3A). In other embodiments, however, replicating this entry may include initiating an active-active replication operation between the first server system 102A and the other server systems 102B-D (as described above with reference to FIG. 3B).

In various embodiments, method 500 may further include generating one or more internally generated alias values for the first user (e.g., during or after the account registration process), where the internally generated alias value includes an identifier of the first network region 110A. For example, in various embodiments this internally generated alias value may be an account number that, in addition to one or more other fields, includes a field used to denote the network region 110 in which the first user created their account with the organization. Note that, in some instances a user 116 may move to a different network region 110 after creating their account with the organization. In some such instances, it may be desirable to include an internally generated alias value in the alias map 114 despite the presence of the network identifier in the internally generated alias value. Accordingly, in some embodiments, method 500 includes the server system receiving an indication that the first user has relocated to a second one of the plurality of network regions and, in response to this indication, the first server system 102A may create an entry corresponding to the internally generated alias value in the alias map 114, where the entry includes an identifier for the second network region (e.g., network region 110D) to which the first user has relocated.

Figure 6:
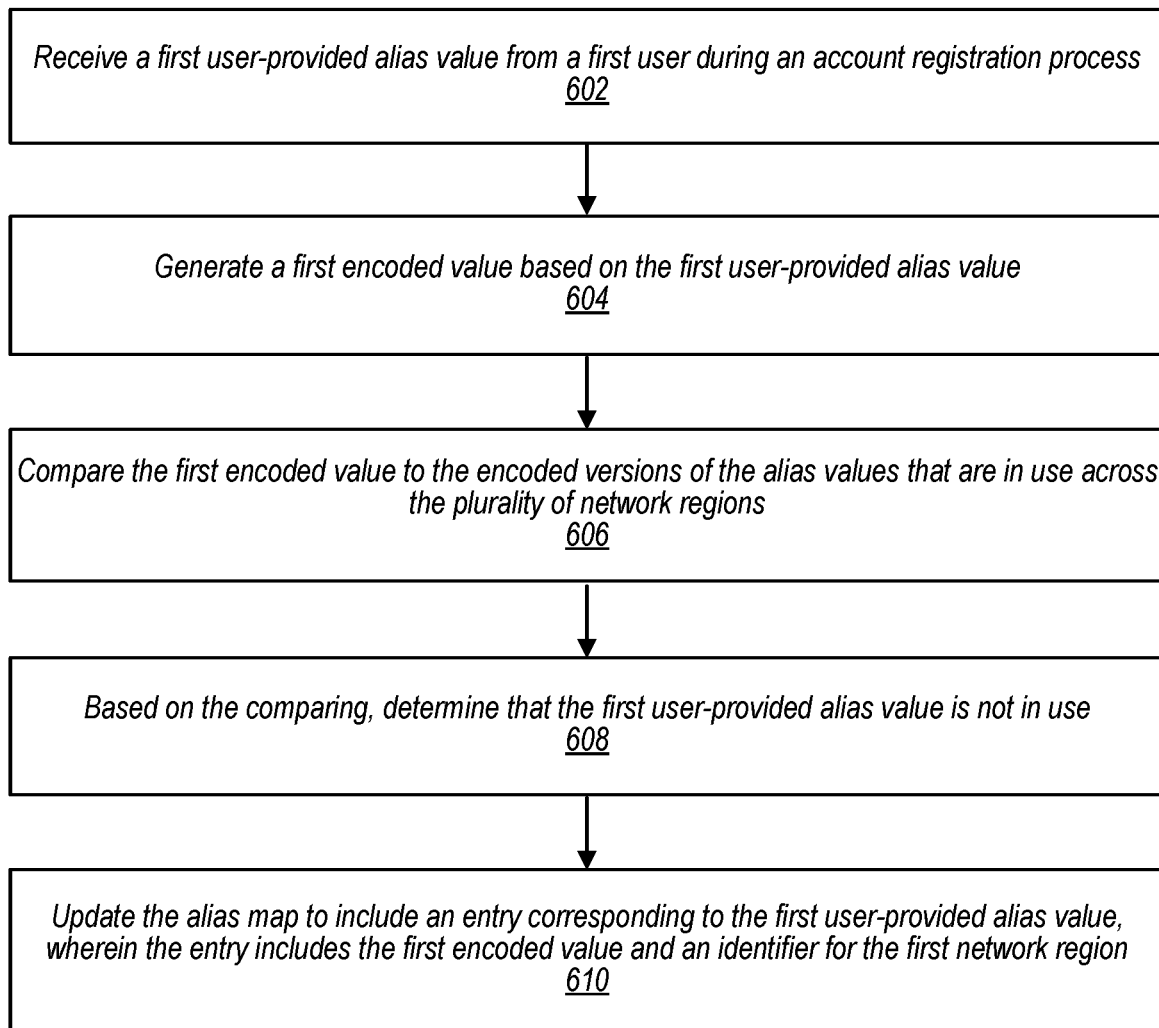

Referring now to FIG. 6, a flow diagram illustrating an additional example method 600 for verifying that an alias value is unique across various network regions is depicted, according to some embodiments. In various embodiments, method 600 may be performed by one of server systems 102 of FIG. 1 to determine whether a particular alias value is already in use in one of the other server systems 102. For example, server system 102 may include (or have access to) a non-transitory, computer-readable medium having program instructions stored thereon that are executable by the server system 102 to cause the operations described with reference to FIG. 6. In FIG. 6, method 600 includes elements 602-610. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, a server system receives a first user-provided alias value from a first user during an account registration process. For example, consider an embodiment in which a user 116T located in network region 110D initiates a registration process to create a user account with server system 102D. In such an embodiment, the user 116T may provide one or more items of information, including an alias value (e.g., a username), as part of the registration process. Before associating this user-provided alias value with a user account for user 116T, however, the server system 102 may first verify that this alias value is unique, both within its own network region 110D and across the other network regions 110A-110C, for which the server system 102D does not have access to a plaintext version of the alias values that are already in use.

At 604, in the illustrated embodiment, the server system generates a first encoded value based on the first user-provided alias value. For example, in one non-limiting embodiment the server system 102D may perform a cryptographic hash function (e.g., SHA-256) on the first user-provided alias value to generate the first encoded value. At 606, in the illustrated embodiment, the server system compares the first encoded value to the encoded versions of the alias values that are in use across the plurality of network regions. For example, at 606 the server system 102D (e.g., through the alias service module 112) may compare the first encoded value to the various encoded alias values in the alias map 114 to determine whether the first user-provided alias value is in use in any of the network regions 110A-110D. For example, in such an embodiment, the server system 102D may use the alias map 114 to determine whether the first user-provided alias value is in use both within its own network region 110D and in any of the other network regions 110A-110C.

At 608, in the illustrated embodiment, based on the comparing, the server system determines that the first user-provided alias value is not in use. For example, in response to detecting no match between the first encoded value and the various encoded alias values in the alias map 114, the server system 102D may determine that the first user-provided alias value is unique across all of the network regions 110. At 610, in the illustrated embodiment, the server system updates the alias map to include an entry corresponding to the first user-provided alias value, where the entry includes the first encoded value and an identifier for the first network. For example, the server system 102D (e.g., through the alias service module 112) may create an entry in the alias map 114 (e.g., a row in a table used to store the encoded alias values and the corresponding region identifiers 204) that corresponds to this first user-provided alias value.

Note that, in some embodiments, an alias value provided by a user during an account registration process may already be in use with the organization, either in the network region 110 in which the user 116 is creating the account or in a different network region 110. For example, consider an embodiment in which the server system 102D in network region 110D receives a second user-provided alias value from a second user during a subsequent account registration process. In this example, the server system 102D may generate a second encoded value based on the second user-provided alias value, compare the second encoded value to the encoded versions of the alias values that are in use across the plurality of network regions, and, based on the comparing, determine that the second user-provided alias value is already in use. In such an embodiment, the server system 102D may send, to the second user 116, a message indicating that the second user-provided alias value is unavailable for use and request that the user 116 provide an alternative. In some embodiments, as part of determining that the second user-provided alias value is already in use includes identifying a different one of the plurality of network regions in which the second user-provided alias value is in use.

Further note that, in some embodiments, the method 600 further includes the server system utilizing internally generated alias values. For example, in some embodiments, the server system 102D may generate an internally generated alias value for the first user, where the internally generated alias value includes an identifier of the first network region (e.g., network region 110D) embedded into the internally generated alias value. Further, in some such embodiments, the method 600 may include receiving an indication that the first user has relocated to a second network region (e.g., network region 110C) and, in response to this indication, the server system 102D may create a second entry, in the alias map 114, corresponding to the internally generated alias value, where this second entry includes an identifier for the second network region 110C. Note that, in various embodiments, the second entry may include an encoded or un-encoded version of the internally generated alias value in the alias map 114.

Communication Between Server Systems in Different Network Regions

As noted above, data localization and data privacy regulations may require an organization to segment or shard its users' data based on the geographic region in which the users reside. For example, with reference to FIG. 1, each of the organization's server systems 102 may only store data for a subset of the organization's user base. Server system 102A, for example, may maintain data for users 106A-106H that are located in network region 110A in which the server system 102A reside. A similar approach may be taken with regard to server systems 102B-102D located in network regions 110B-110D, respectively. So, even though an organization may be said to logically have one global user-base, in various embodiments the organization utilizes server systems 102 that have access to data for one subset of users 116 but do not have access to data for other subsets of users 116 that are located in different network regions 110.

This situation may be particularly problematic in instances in which an organization provides a service in which users 116 in one network region 110 interact with users 116 located in another network region 110. As a non-limiting example, consider an instance in which the server systems 102 are used to provide an online payment service in which the users 116 of the organization may be on both sides of an electronic transaction but reside in different network regions 110. For example, to process a transaction in which one user 116 (e.g., 106A) is located in a first network region 110 (e.g., network region 110A) and the other user 116 (e.g., 106J) is located in a second network region 110 (e.g., network region 110B), the server system 102A (or server system 102B) may need to access data for both users, which, due to the data-localization requirements, may be stored in different network regions 110. One potential approach is to instantiate an isolated instance of the service(s) in each of the network regions 110, however this approach presents various technical problems. For example, this approach fails to support cross-geo interactions between users 116 located in (or otherwise associated with) different network regions 110.

In various embodiments, the disclosed techniques may solve these technical problems by facilitating communication between server systems 102 that are located in different network regions 110 and that, due to data localization or other regulations, are unable to freely share users' data between the server systems 102. Continuing with the non-limiting example above, consider an instance in which server system 102A receives a request from user 116A to transfer funds to user 116J as payment for an electronic transaction. In such an instance, the request from user 116A may include an alias value (e.g., an email address) associated with the user 116J. Upon receiving this request, the server system 102A may first determine whether that alias value is associated with a user in network region 110A, for example by consulting the local alias values 402A that are in use locally within network region 110A. In the present example, the server system 102A would determine that the user 116J is not associated with network region 110A and use the alias map 114 to determine the appropriate network region 110 to either route the request or to request a limited set of data about the user 116J (e.g., data values that do not violate data localization requirements) to be sent to the server system 102A. For example, the server system 102A may generate an encoded (e.g., hashed) version of the alias value and use this encoded value as a key to look up the user 116J's corresponding network region 110 in the alias map 114. Once the server system 102A determines that the user 116J is associated with network region 110B, the server system 102A may send a communication to the server system 102B located in network region 110B. As described in more detail below, in some embodiments, in addition to including information about the request, this communication to network region 110B may include a limited set of data corresponding to user 116A to be used as part of a proxy account or may include context information to facilitate performance of the transaction.

Note that, although the example above relates to a situation in which a request needs to be re-directed because one of the users 116 is associated with a different network region 110, this is merely one non-limiting example and, in other embodiments, the disclosed techniques may be used to facilitate communication between network regions 110 in various contexts. For example, in some embodiments the disclosed techniques may be used to determine the appropriate network region 110 to route a user during a login operation, or to retrieve or process data for a user 116 in a different network region 110 to complete processing of a request within its own network region 110. Further note that, instead of or in addition to using the alias map 114 to determine the appropriate network region 110 to route a communication, the disclosed techniques may also use network identifiers that are embedded within an alias value (e.g., an internally generated alias value described above, such as an account number or client ID) to identify the appropriate network region 110.

The disclosed techniques may provide various technical benefits, including enabling the efficient routing of requests between the various network regions 110, which may improve the operation of the interconnected server systems 102 while still complying with applicable data localization and data privacy requirements.

Figure 7:
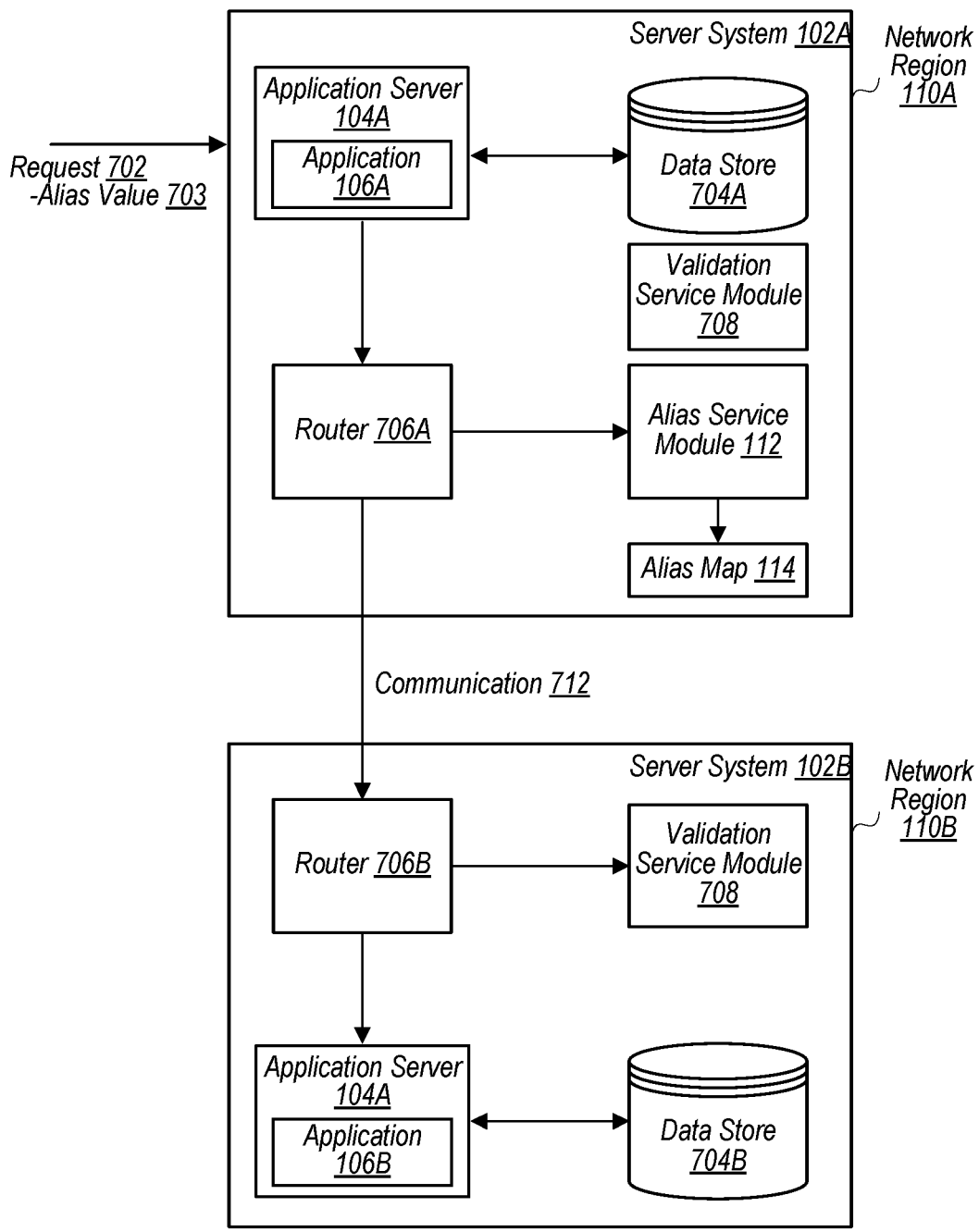
FIG. 7 is a block diagram illustrating an example computer network in which communications are routed between server systems located in different network regions based on an alias map, according to some embodiments.

In FIG. 7, block diagram 700 depicts an embodiment in which communications are routed between server systems 102 at different network regions 110 using alias map 114, according to some non-limiting embodiments. More specifically, FIG. 7 depicts an embodiment in which communications are routed between server system 102A located in network region 110A and server system 102B located in network region 110B. In the depicted embodiment, server system 102A receives a request 702 to perform an operation associated with the server system 102A or the service(s) it provides. For example, in some embodiments the request 702 is a request from a first user 116A of a service provided by the server system 102, and the request 702 is to perform an operation relating to a second user 116J of the service having a corresponding alias value 703. As one non-limiting example, in embodiments in which the server systems 102 are used to provide an online payment service to users 116 located in the various network regions 110, the request 702 may be a request to transfer funds from an account associated with user 116A to an account associated with user 116J. In some such embodiments, the request 702 may include details relating to the requested operation and an alias value 703 for the second user 116J. Note, however, that this embodiment is provided merely as one non-limiting example. In other embodiments, request 702 may originate from a third-party application (e.g., hosted by a third-party system) that integrates with or otherwise utilizes the service(s) provided by server systems 102. In still other embodiments, request 702 may be an internally generated request from one application 106 to another executing within the server system 102.

To process the request 702, the server system 102A may need to send one or more communications 712 to other server systems 102B-102D depending, for example, on the nature of the request 702, the network regions 110 with which the relevant users 116 are associated, etc. In the depicted embodiment, application 106 may need to route a communication 712, which may include information corresponding to the request 702, to the server system 102B so that the requested operation may be performed in network region 110B. For example, in the depicted embodiment, in response to the request 702, an application 106 may attempt to retrieve data needed to process the request 702 from the data store 704A and determine that the data is not available locally. In response, the application 106 initiates a call to send communication 712 (with information corresponding to the request 702) to another network region 110. In various embodiments, the application 106 embeds the alias value 703 (e.g., an email address) in a header of a token (e.g., a JSON Web Token ("JWT"), a Security Assertions Markup Language ("SAML") token, or any other suitable type of token) that is included in or with the communication 712.

In various embodiments, the application 106 then passes this communication 712 to the router 706A. In the depicted embodiment, the outbound router 706A uses the alias map 114 to determine the appropriate network region 110 for the communication 712 based on the encoded version of the alias value 703 that is included in the token. For example, in FIG. 7, the router 706A makes a call to the alias service module 112, which uses the encoded version of the alias value 703 to perform a lookup in the alias map 114 and determine a particular network region 110 (e.g., network region 110B, in the current example) with which the alias value 703 is associated.

Further, in various embodiments the server system 102A may include a signature value in an access token that is included in the communication 712 sent to the server system 102B, which may allow the server system 102B to validate the source of the communication 712. For example, in the depicted embodiment, server system 102A includes validation service module 708, which may generate a signature value representing the network region 110A from which the communication 712 is being sent. As one non-limiting example, in some embodiments the validation service module 708 may generate this signature value using a private key of a public-private key-pair that is associated with the network region 110A (or with the server system 102A). Note, however, that this embodiment is listed merely as one non-limiting example and, as will be appreciated by one of skill in the art with the benefit of this disclosure, this signature value may be generated using other suitable techniques.

In the depicted embodiment, router 706A in network region 110A then directs the communication 712 to the network region 110B. In FIG. 7, the inbound router 706B directs the access token including the signature value to the validation service module 708 to be validated. For example, in various embodiments the validation service module 708 has access to public certification information for the various network regions 110 and can use this certification information to validate a signature value included, by the source server system 102A, in the access token. If the validation is successful, the router 706B routes the communication 712 to the appropriate application 106 executing at the server system 102B, which may access the relevant data locally in data store 704B and process the request 702.

Note that the embodiment described with reference to FIG. 7 relates to a situation in which a communication 712 is routed using the alias map 114 so that a requested operation may be performed in the appropriate network region 110. In other embodiments, however, the alias map 114 may be used to route communications between network regions 110 in various other situations. As one non-limiting example, in some embodiments the server systems 102 may use the alias map 114 to determine the appropriate network region 110 to route a login request when a user 116 attempts to login to a service provided by the server systems 102 while that user 116 is physically located in a different network region 110. As a non-limiting example, consider an instance in which a user 116A that is associated with network region 110A is traveling to network region 110B and attempts to login to the service provided by server systems 102. In this scenario, the user 116A may initially be routed to a server system 102B based on the IP address of the user 116A's device. Upon receiving this login request, the server system 102B may first look for the user data for user 116A locally in data store 704B and, in response to not finding the data locally, may use an alias value provided by the user 116A to lookup the user 116A's network region 110 in the alias map 114. The server system 102B may then re-direct the user 116A to the server system 102A with which that user is associated to complete the login process.

Figure 8:
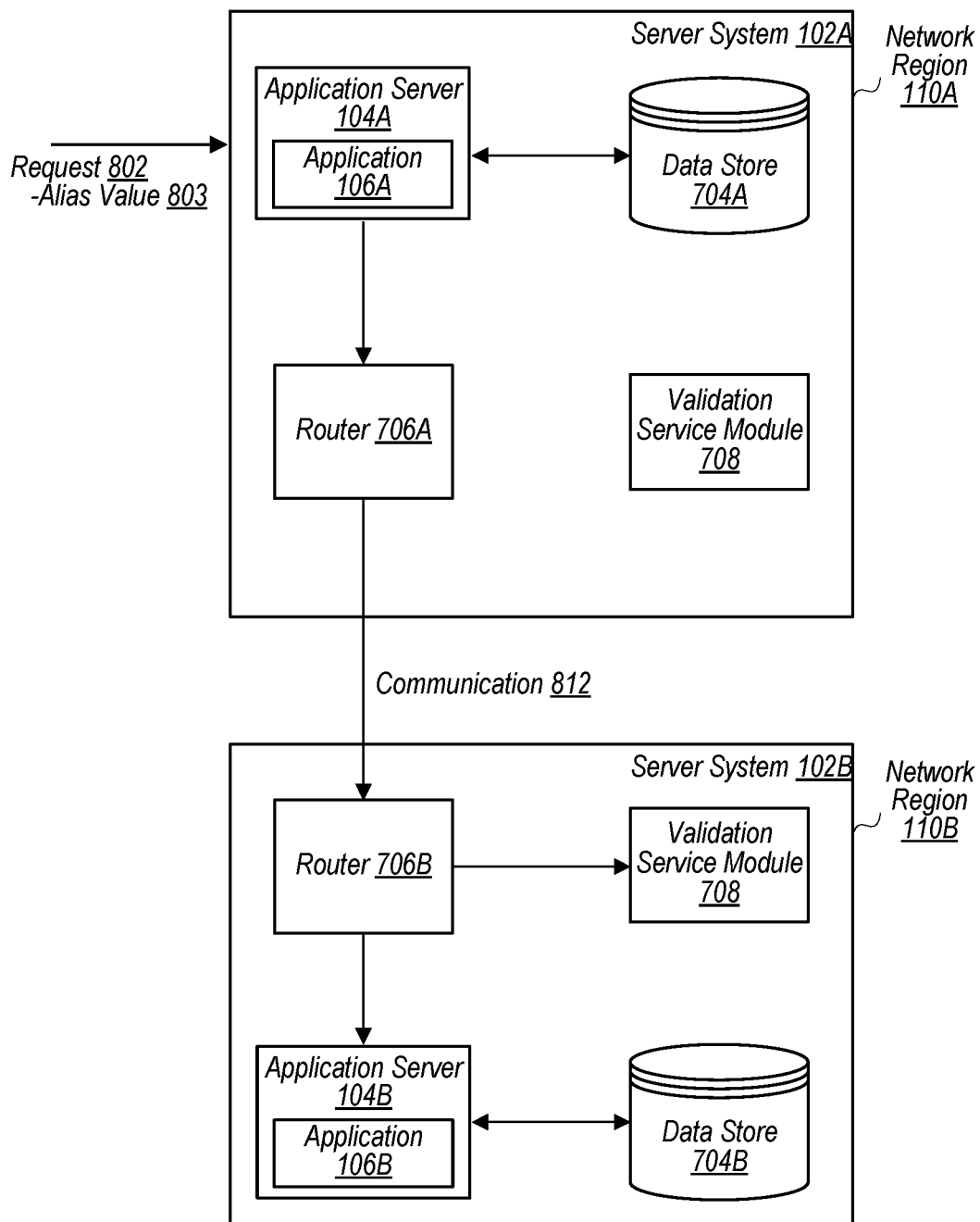
FIG. 8 is a block diagram illustrating an example computer network in which communications are routed between server systems located in different network regions based on embedded region identifiers, according to some embodiments.

Referring now to FIG. 8, block diagram 800 depicts an embodiment in which communications are routed between server systems 102 at different network regions 110 using identifiers that have embedded network identifiers, according to some non-limiting embodiments. More specifically, FIG. 8 depicts an embodiment in which a communication 812 is sent from server system 102A located in network region 110A to server system 102B located in network region 110B based on a network identifier that is embedded in an alias value 803. In the depicted embodiment, server system 102A receives a request 802 to perform an operation associated with the server system 102A or the service(s) that it provides. In various embodiments the request 802 may be from a user 116 of these services, an application 106 executing within one of the server systems 102, or from a third-party application hosted by a third-party system. In the depicted embodiment, the request 802 includes an alias value 803 that includes an embedded network identifier. For example, in various embodiments the alias value 803 may be an internally generated alias value that was generated, by one of server systems 102A-102D, during or after an account registration process with a particular one of the users 116.

As discussed above with reference to FIG. 7, in some embodiments the server system 102A may need to send one or more communications 812 to other server systems 102 located in another network region 110 to process the request 802. As a non-limiting example, the request 802 may relate to a user that is associated with a different network region 110 than the server system 102A and the data needed to process that request 802 may be stored in that other network region 110. In FIG. 8, for example, application 106 first checks local data store 704A to determine whether the requested data (or data needed to perform a requested operation) is available locally. If the data is not found, the application 106A may initiate a call to send a communication 812 corresponding to the request 802 to an application 106 executing at a server system 102 in a different network region 110. For example, the application 106A may identify a network identifier that is embedded in the alias value 803 and include that network identifier in a header of a token (e.g., a JWT) that is included in or with the communication 812. In the depicted embodiment, the outbound router 706A interrogates the token and determines the appropriate network region 110 to route the communication 812 to based on the network identifier. Note that, in some embodiments, router 706A of FIG. 8 may first attempt to use the alias map 114 to determine the network region 110 to which to route the communication 812. For example, in some embodiments, router 706A may make a call to the alias service module 112 (not pictured in FIG. 8, for clarity), which uses the encoded version of alias value 803 to perform a lookup in the alias map 114. If there is no explicit record associated with that alias value 803 in the alias map 114, the alias service module 112 may return this result to the router 706A, which may then use the embedded network identifier embedded in alias value 803 as a default to determine the network region 110 to which to route the communication 812, according to some embodiments. Applicant notes that such embodiments may be advantageous in instances in which a user 116 has moved from one network region 110 to another and has had one or more internally generated alias values recorded in the alias map 114, as described above.

In the depicted embodiment, for example, the router 706A sends the communication 812 to an inbound router 706B located at server system 102B in network region 110B. Note that, in some embodiments the communication 812 may also include an access token with a signature value used to represent the source network region 110A from which the communication 812 was sent. For example, as described above with reference to FIG. 7, in some embodiments the validation service module 708 is operable to generate a signature value based on credentials (e.g., a private key) associated with the server system 102A or the network region 110A.

In the depicted embodiment, once the communication 812 is received at the inbound router 706B in the destination network region 110B, the router 706B may validate the signature value included in the access token (e.g., using the validation service module 708). For example, in various embodiments the validation service module 708 has access to public certification information for the various network regions 110 and can use this certification information to validate the signature value included in the access token. If the validation is successful, the communication 812 is then routed to the appropriate application 106 executing at the destination server system 102B in the network region 110B, which may access the data locally in data store 704B and process the request 802.

Note that, in some embodiments, requests may be routed between server systems 102 in different network regions 110 by an inbound router 706 prior to attempting to authenticate a user 116 or look for data in a local data store. As one non-limiting example, consider an instance in which server system 102A receives, via router 706A, a request that includes an alias value with an embedded region identifier. In some such embodiments, the router 706A may verify that the request (e.g., an API request) has been sent to the correct network region 110A based on this embedded region identifier. If the request has been sent to the incorrect network region 110 (e.g., due to the use of a generic API domain name as opposed to a region-specific API domain name), the router 706 may determine the appropriate network region 110 and route the request to a server system 102 in that region 110.

Figure 9:
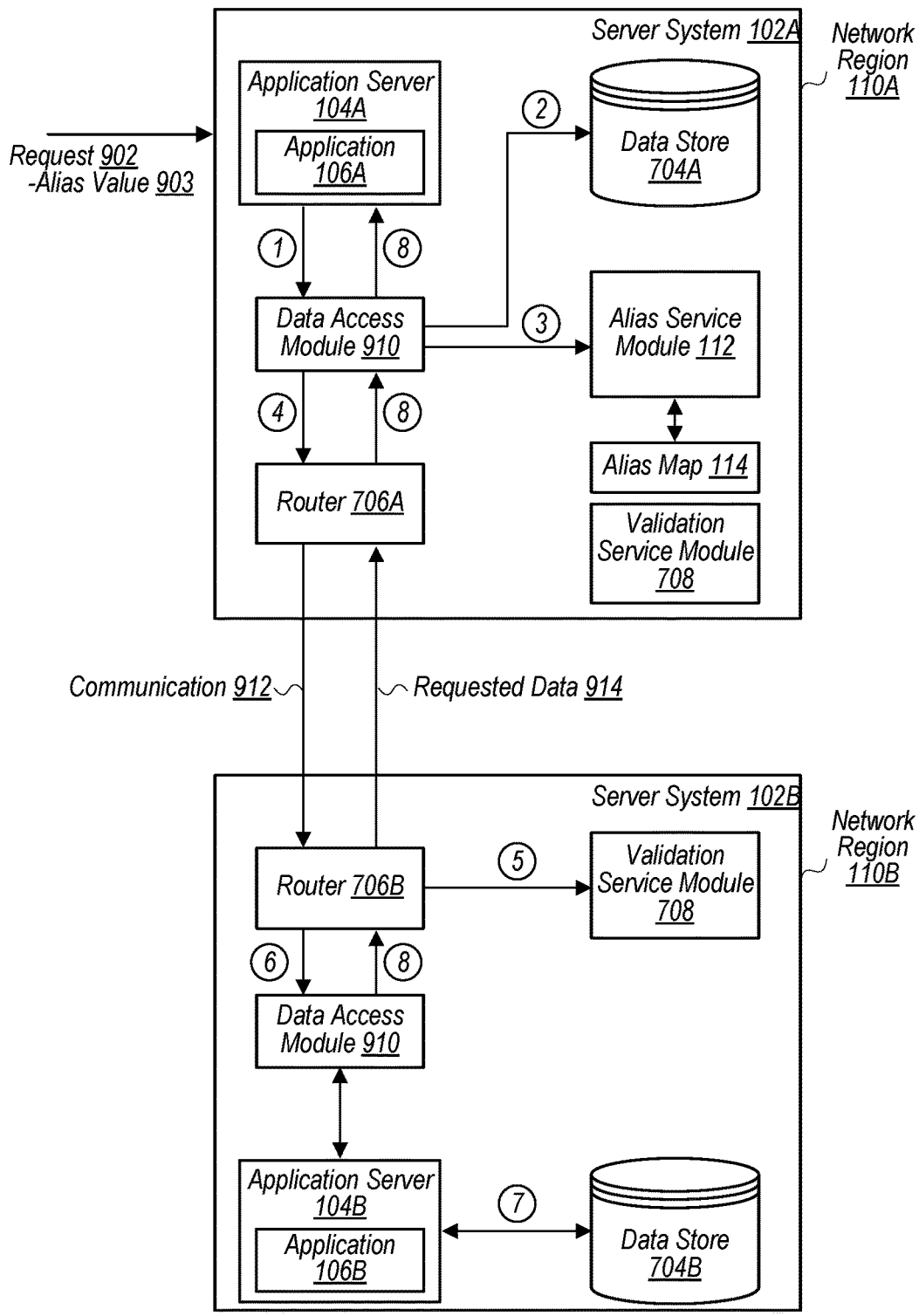
FIG. 9 is a block diagram illustrating an example computer network in which a server system in a first network region retrieves data from a second server system located in a second network region, according to some embodiments.

In various embodiments, the disclosed techniques may be used to communicate data (e.g., user data) between server systems 102 located in different network regions 110. In FIG. 9, for example, block diagram 900 depicts an embodiment in which a server system 102A in network region 110A retrieves user data from a server system 102B in a different network region 110B, according to some non-limiting embodiments. To facilitate discussion of FIG. 9, consider an example embodiment in which the server systems 102 provide an online payment service and user 116A in network region 110A is a buyer that establishes a shopping cart with an online merchant user 116J located in network region 110B. In this situation, the cart information may be stored at the server system 102B located in network region 110B such that, when the buyer user 116A logs into the server system 102A, the server system 102A does not have this cart information stored locally. As a result, the server system 102A, in this example, will need to communicate with the server system 102B located in network region 110B to get the cart information.

In the depicted embodiment, application 106A first receives the request 902, from the user 116A, to complete the transaction with, and transfer funds to, user 116J. In some embodiments the request 902 may include the alias value 903, though in other embodiments the application 106 may retrieve or derive the alias value 903 from other sources (e.g., derived from API credentials used to make the request). In FIG. 9, application 106 (at "1") sends a request to a data access module 910 for the cart information. In some embodiments, the application 106 may send this request as a GraphQL request, which may increase the ease with which the application 106A (or the user 116A) can specify which data is needed. In the depicted embodiment, the data access module 910 checks (at "2") for the data that it needs locally in data store 704A. If, as in the depicted embodiment, the data is not found locally, the data access module 910 then determines the correct server system 102 of record for the requested data.

In the depicted embodiment, the data access module 910 makes a call (at "3") to the alias service module 112 for an identifier of the appropriate server system 102 from which to request this data. In various embodiments, the alias service module 112 may query the alias map 114 (e.g., using an encoded version of alias value 903) to retrieve a region identifier associated with the alias value 903, which the alias service module 112 may then return to the data access module 910. Note that, in other embodiments, the data access module 910 may use a region identifier that is embedded in the alias value 903 to determine the appropriate network region 110 from which to retrieve the requested data, as described above. In the depicted embodiment, the data access module 910 then (at "4") initiates a communication 912 to the identified server system 102 of record (server system 102B, in the depicted embodiment). For example, in the depicted embodiment, the router 706A sends the communication 912 to an inbound router 706B located at the server system 102B in network region 110B. Note that, in various embodiments, communication 912 may include an access token (generated, for example, by validation service module 708) that includes a signature value representing the network region 110A from which the communication 912 is being sent, as described above.

Once the communication 912 is received at the inbound router 706B in the destination network region 110B, the router 706B may send a call (at "5") to a validation service module 708 that has public certification information for the source network region 110A and can use this certification information to validate the signature value included, by the source server system 102A, in the access token. If the validation is successful, a request is then routed (at "6") to the appropriate application 106B executing at the destination server system 102B, which may access the data locally (at "7") in data store 704B and return the requested data 914 to the requesting network region 110A (at "8"). Once the data access module 910 receives the requested data 914, it may be routed to the original application 106A for use in servicing the request 902. Note that, in some embodiments, this data may also be persisted in the local data store 704A in server system 102A such that the disclosed techniques may be said to synchronize a portion of user data (e.g., a portion of data that does not violate data localization regulations) across different network regions 110. Further note that, in some embodiments, rather than returning the requested data 914, the server system 102B may instead access the requested data 914 and process the request 902 locally, as desired.

In various embodiments, the disclosed techniques may be used to pass "context" information from a source network region 110 to a destination network region 110, either alone or in addition to one or more other items of information being communicated between the two network regions 110. Sending such context information between server systems 102 in different network regions 110 may provide various technical benefits, such as enabling the destination network region 110 to establish the appropriate execution context to be used in processing the accompanying request from the source network region 110. For example, in some such embodiments, passing context information between network regions 110 can enable the server system 102 in the destination network region 110 to know which server system 102 is sending a request, the user 116 on whose behalf the request is sent, what permissions that user 116 has, etc.

For instance, consider again the non-limiting example introduced above in which a user 116A in network region 110A is a buyer and a user 110J in network region 110B is a merchant in an online transaction. In this situation, once the server system 102A receives the request, from user 116A, to transfer funds to user 116J, the server system 102A may perform session-based or API credential based authorization. Once authorized, the server system 102A may establish a security context for the user 116A that may be shared throughout the service(s), for example to know the user 116A's identity, what permissions this user 116A has, etc. In various embodiments, once the server system 102A determines that it needs to retrieve data from server system 102B in network region 110B, it may take information about this context and encode that context information into the request that is being sent to network region 110B. For example, in some embodiments this context information may be included in a token (e.g., structured as a JWT) that is signed with the server system 102A's private key. The destination network region 110B may then verify this signature using the server system 102A's public key.

As one specific example, assume that there is a buyer in the U.S. and a seller in China and that the buyer has logged into the system and authorized a payment to the seller. The U.S. system may then send that authorization to the seller in the China network region so that the system in China can complete the transaction. At the point in the processing of the transaction in which the server system 102 in the U.S. needs to inform the seller that the transaction is approved, it first needs to know the network region 110 with which the seller is associated (e.g., using the alias map 114). The U.S. server system 102 may then generate an access token (e.g., a JWT) to represent the U.S. server system 102 as well as the context of the buyer (e.g., indicating that the buyer is logged into the U.S. system). The U.S. server system 102 may then send this token (along with a request, for example) to the server system 102 in China, which may validate a signature included in the token and then establish the appropriate context based on the context information included in the token. (Note, however, that this is merely one non-limiting example and is not intended to limit the scope of the present disclosure.) Thus, in various embodiments, the disclosed techniques may be used to determine the network region 110 with which a particular user 116 is associated (e.g., using alias map 114 or the embedded network identifiers in an alias value) and to convert the local execution or security context into a token (e.g., a JWT) that can be authenticated in the remote network region 110. The server system 102 in the remote network region 110 may then convert this context information from the token back into a context, within its local server system 102, that represents both the original user 116 and the requesting server system 102 in the source network region 110.

As noted above, in various embodiments an organization may provide a "two-sided" service in which users 116 on both sides of an electronic transaction (e.g., a financial transaction, in some non-limiting embodiments) are utilizing the service(s) provided by the organization. For example, in some embodiments an organization may provide an online payment service in which a first user, e.g., user 116A in network region 110A, uses the service to transfer funds to a second user, e.g., user 116N in network region 110C, as part of a financial transaction. In this scenario, the above-discussed data localization requirements may present a technical problem because the organization's server systems 102 in these different network regions 110 are unable to access both users' data at the same time, interfering with the organization's ability to perform the transaction.

In various embodiments, the disclosed techniques include using a "proxy" account in one or more of the network regions 110 to facilitate such a transaction. In the current example, for the server system 102A on the buyer's side to facilitate the transaction, the server system 102A will need access to some information about the seller, user 116N, such as the seller's name, MCC, etc. To facilitate this, the server system 102A may create a "shadow" or "proxy" account, for the seller 106N within the server system 102A. As discussed below, this proxy account may include the minimum amount of data needed to support the transaction, rather than all of the user 116N's data that the server system 102C may have (e.g., date of birth, email address, etc.). Additionally, as discussed below, the server system in the seller's network region 110 may create a proxy account for the buyer to facilitate performing its part of the transaction.

Note that, in various embodiments, the buyer's representation in the seller's network region 110 will not be the same as the buyer's representation in the buyer's network region 110. For example, in some embodiments the information about the buyer will be translated into a security context that makes sense in the seller's network region 110. This process may be thought of as a translation of the context from the buyer's account representation in the buyer's network region 110 into a proxy account representation in the seller's network region 110. This proxy representation of the buyer may also be persisted within the seller's network region 110 such that it may be used for subsequent transactions of the buyer in the seller's network region 110.

In some embodiments, this translation process is performed by a core network identity ("CNI") system that relates a public identifier of a user 116's account in one network region 110 into the representation of that account in the destination network region 110. In some such embodiments, when the proxy account is created in the destination network region 110, part of the data that is included in the proxy account is the public identifier of the account in the home network region 110, which gets recorded as another alias value for that account. When a request then comes in, part of the access token's data may include the public identifier for that user account, such that when the server system 102 in the destination network region 110 authenticates this token it may also look up the local representation of that user account using the account number. For example, if a user 116A's account number in the U.S. network region 110 is "123" and the public identifier is "abc," the public identifier "abc" may be used as a public name for the account. When the server system 102 in the destination network region 110 creates the proxy account for this user account, it may create a new account number (e.g., "789") but will mention that the original account in the U.S. network region 110 has a public identifier of "abc." When the server system 102 in the U.S. network region 110 then sends a token that identifies the user account as "abc," the server system 102 in the destination network region 110 can look up the local identifier "789" such that the security context says "789" instead of "123."

The proxy account representation of the buyer in the seller's network region 110 may include just enough information to support the transaction between the buyer and seller such that this sharing of data does not violate the data localization requirements. Note that, as a general rule, the purpose of partitioning the organization's user data is to keep user data in the appropriate network region, rather than distributing that user data across all systems. One exception to this general rule arises in the context of cross-region transactions in which some of the user data needs to be shared across network regions 110 in order to facilitate this transaction. In various embodiments, it is this level of information that is provided to the other network region 110 (e.g., the seller's network region 110) and persisted as part of the proxy account.

Referring now to FIG. 10, a flow diagram illustrating an example method 1000 for routing communications between network regions 110 using an alias map 114 is depicted, according to some embodiments. In various embodiments, method 1000 may be performed by server system 102A of FIG. 7 to route a communication 712 corresponding to request 702 to server system 102B located in network region 110B. For example, server system 102A may include (or have access to) a non-transitory, computer-readable medium having program instructions stored thereon that are executable by the server system 102A to cause the operations described with reference to FIG. 10. In FIG. 10, method 1000 includes elements 1002-1016. While these elements are shown in a particular order for ease of understanding, other orders may be used. In various embodiments, some of the method elements may be performed concurrently, in a different order than shown, or may be omitted. Additional method elements may also be performed as desired.

At 1002, in the illustrated embodiment, a first server system located in a first one of a plurality of network regions receives a request, from a first user, to perform a first operation with a second user, where the request includes an alias value for the second user. For example, with reference to FIG. 7, user 116A may send a request 702 to the server system 102A, for example via a webpage used, by the server system 102, to expose one or more aspects of the service(s) it provides. In some embodiments, this request 702 may be to perform an operation relating to a second user 116J of the server system 102. In an embodiment in which the server system 102 is used to provide an online payment service to users 116 in various network regions 110, as a non-limiting example, the request 702 may be to transfer funds from an account associated with user 116A to an account associated with user 116J. Note, however, that this embodiment is provided merely as one non-limiting example and, in other embodiments, the request 702 may be to perform any of various suitable types of computing operations. Further note that, although received from a user 116 in the embodiment of FIG. 10, in some embodiments the request may be received (e.g., as an API request) from another application that is internal or external to the server system 102A. As a non-limiting example, in some embodiments the request received at element 1002 is an API request received from a third-party application hosted by a third-party system.

At 1004, in the illustrated embodiment, the first server system determines, based on the alias value, that the second user is not associated with the first network region 110A. For example, in some embodiments, the server system 102A may, as described above with reference to FIG. 4, have access to a set of local alias values 402A that are in use within its respective network region 110A. In some such embodiments, these local alias values 402A may be stored in a plaintext format that may be directly inspected (e.g., by the alias service module 112). In other embodiments, the server system 102A may store these local alias values 402A in an encrypted format using a key that is available within the computing environment of server system 102A such that the plaintext versions of these local alias values 402A may still be accessed within server system 102A (e.g., by alias service module 112). In various embodiments, the server system 102A may compare the alias value specified in the request to the set of local alias values 402A to determine if there is a match. If a match is detected, the server system 102A may determine that the second user specified in the request is associated with the first network region 110A. If no match is detected, however, the server system 102A may determine that the second user specified in the request is not associated with the first network region 110A. Note that, in various embodiments, the first server system does not have access to a subset of alias values that are associated with users associated with one or more of the other network regions. In the current example, for instance, the server system 102A does not have access to plaintext versions of alias values that are associated with users 116 that are associated with network regions 110B-110D.

At 1006, in the illustrated embodiment, the first server system accesses an alias map that specifies encoded versions of alias values that are in use across the plurality of network regions. For example, the alias service module 112 may access the alias map 114, which as described above includes a mapping of encoded alias values to the corresponding network regions 110 with which those alias values are associated. At 1008, in the illustrated embodiment, the first server system determines that the second user is associated with a second one of the plurality of network regions. For instance, in the instant example embodiment, the server system 102A may determine that the second user specified in the request (e.g., user 116J) is associated with a second network region 110B. In the depicted embodiment, element 1008 includes sub-elements 1010-1014. Note, however, that this embodiment is provided merely as one non-limiting example and, in other embodiments, element 1008 may include additional, fewer, or different sub-elements, as desired.

At 1010, in the illustrated embodiment, the first server system generates a first encoded value based on the alias value (e.g., the alias value specified in the request received at 1002). For example, in various embodiments the alias service module 112 may generate a first encoded value based on this alias value using any of various suitable encoding techniques. Non-limiting examples of encoding techniques that may be used to generate the first encoded value include various hashing techniques, such as MD5, SHA-256, etc. As one non-limiting example for the purposes of illustration, the alias value may be the email address "user@example.com" and the first encoded value generated based on this alias value may be "5uJ3cbH3iwK1." At 1012, in the illustrated embodiment, the first server system compares the first encoded value to the encoded versions of alias values specified in the alias map. For example, the alias service module 112 may compare the first encoded value to the set of encoded alias values 202 specified in the alias map 114. At 1014, in the illustrated embodiment, the first server system determines that the first encoded value matches a second encoded value in the alias map, where the second encoded value is associated with an identifier for the second network region. Continuing with the current example, the server system 102A may determine that the first encoded value matches the encoded value specified in the fifth row of example alias map 114 depicted in FIG. 2. In this non-limiting example, the encoded value of "5uJ3cbH3iwK1" has a corresponding region identifier 204 of "01," which in the example embodiment is associated with network region 110B.

At 1016, in the illustrated embodiment, the first server system routes a first communication, corresponding to the request, to a second server system that is located in the second network region. For example, server system 102A may send a communication (e.g., an HTTP message) to the server system 102B located in network region 110B, where the server system 102B may take various appropriate actions depending on the nature of the original request. For example, in some embodiments the second server system 102B may retrieve and provide data back to the first server system 102A. For example, in some embodiments, method 1000 further includes the first server system 102A receiving, from the second server system 102B, a second communication that includes a limited set of data corresponding to the second user 116J, and creating a proxy account associated with the second user 116J in the first server system 102A, where the proxy account includes at least a portion of this limited set of data. Note that, in various embodiments, this limited set of data send from server system 102B to server system 102A may include only those items necessary for the completion of a requested operation so as to maintain the security of the user 116J's data and to comply with applicable data localization requirements. As described above, in some embodiments the proxy account may be used, by the first server system 102A, to perform the requested operation based on some or all of the data included in the proxy account for the second user 116J.

Note that, in some embodiments, the limited set of data corresponding to the second user 116J includes a public identifier for a second user account, of the second user 116J, in the second network region 110B. In some such embodiments, method 1000 further includes creating, by the first server system 102A for the second user account in the second network region 110B, a local account number to identify the proxy account in the first network region 110A, and the first server system 102A updating the proxy account to associate the local account number with the public identifier for the second user account in the second network region 110B.

Further, in some embodiments, method 1000 includes utilizing embedded network identifiers to route communications between different network regions 110. For example, in some embodiments, method 1000 includes the first server system 102A receiving, from the second server system 102B located in the second network region 110B, a second request to perform a second operation associated with a particular user that is associated with the first network region 110A. In some such embodiments the second request includes a third encoded value that is based on a particular alias value for the particular user, but, in some embodiments, the second request does not include a plaintext version of the particular alias value. In some such embodiments, method 1000 further includes the first server system 102A performing a lookup operation in the alias map 114 using the third encoded value to determine that the third encoded value matches the first encoded value and identifying the first user as the particular user associated with the second request to perform the second operation.

Additionally note that, in some embodiments, after receiving the first communication sent by the first server system 102A at element 1016, the second server system 102B may process a requested operation that relates to the user 116J that is associated with the network region 110B. In some such embodiments, the first communication may include a limited set of data corresponding to the first user 116A, which may help facilitate performing the requested operation. As one non-limiting example, in some embodiments this limited set of data may be specified in a token (e.g., a JWT) included in or with the first communication. Further, in some embodiments, the first communication from the first server system 102A may include one or more items of context information relating to an execution context or security context of the first user 116A in the first server system 102A. For example, in some embodiments, method 1000 includes the first server system 102A performing an authentication operation to establish a security context for the first user 116A in the first server system 102A and including one or more items of context information associated with the security context in the first communication sent to the second server system 102B.

Further, in some embodiments, method 1000 includes routing communications between server systems 102 based on one or more embedded network identifier values. For example, in some embodiments, the first server system 102A may receive a second request to perform a second operation, where the second request specifies a second alias value that includes an embedded network identifier. Based on this embedded network identifier, the first server system 102A may then determine that the second alias value is associated with the second network region 110B and may send, to a second server system 102B that is located in the second network region 110B, a second communication corresponding to the second request. In some embodiments, determining that the second alias value is associated with the second network region includes parsing the second alias value to identify, at a predetermined location within the second alias value, the embedded network identifier. In such an embodiment, the first server system 102A may further generate an access token to identify the first network region 110A and include that access token in (or with) the second communication sent to the second server system 102B.

Referring now to FIG. 11, a flow diagram illustrating an example method 1100 for routing communications between network regions 110 using an alias value with an embedded network identifier is depicted, according to some embodiments. In various embodiments, method 1100 may be performed by server system 102A of FIG. 8 to identify the appropriate network region 110 to send a communication based on a request 802 with an alias value 803 having an embedded network identifier. For example, server system 102A may include (or have access to) a non-transitory, computer-readable medium having program instructions stored thereon that are executable by the server system 102A to cause the operations described with reference to FIG. 11. In FIG. 11, method 1100 includes elements 1102-1110. While these elements are shown in a particular order for ease of understanding, other orders may be used. In various embodiments, some of the method elements may be performed concurrently, in a different order than shown, or may be omitted. Additional method elements may also be performed as desired.

At 1102, in the illustrated embodiment, a first server system located in a first one of a plurality of network regions receives a request to perform a first operation. For example, with reference to FIG. 8, server system 102A may receive a request 802 to perform an operation associated with the server system 102A or a service it provides. In this embodiment, the request 802 includes an alias value 803 that has an embedded network identifier. As described in detail above, this embedded network identifier may identify a particular network region 110 with which the alias value 803 is associated.

At 1104, in the illustrated embodiment, the first server system determines, in response to the request, that a communication corresponding to the request is to be sent to a different one of the plurality of network regions. For example, in response to the request 802, an application 106 executing at the server system 102A may attempt to retrieve one or more items of data from a local data store 704A for use in processing the request 802. In response to a determination that the necessary data is not available locally, the server system 102A may determine that the request 802 is associated with a user 116 that is associated with a different network region 110 and, as such, determine that a communication 812 corresponding to the request 802 is to be sent to that different network region 110.

At 1106, in the illustrated embodiment, the first server system analyzes the alias value to identify the embedded network identifier. For example, in various embodiments the alias value 803 is an internally generated alias value in which a region identifier has been embedded at a particular location within the alias value. In such an embodiment, the server system 102A may parse the alias value 803 to identify the embedded region identifier at this particular location. At 1108, in the illustrated embodiment, based on the embedded region identifier, the first server system identifies a second network region as the appropriate network region for the communication. For example, at element 1106 the first server system 102A may determine that the region identifier embedded in the alias value 803 is "01," which, according to one non-limiting embodiment, may be used to identify network region 110B. Accordingly, in this non-limiting example, at element 1108 the server system 102A may identify the network region 110B as the appropriate network region 110 for the communication 812. At 1110, in the illustrated embodiment, the first server system sends the communication to a second server system that is located in the second network region. For example, the server system 102A may send the communication 812 to the server system 102B located in network region 110B, where the server system 102B may access the relevant data locally from data store 704B and process the requested operation.

Figure 12:
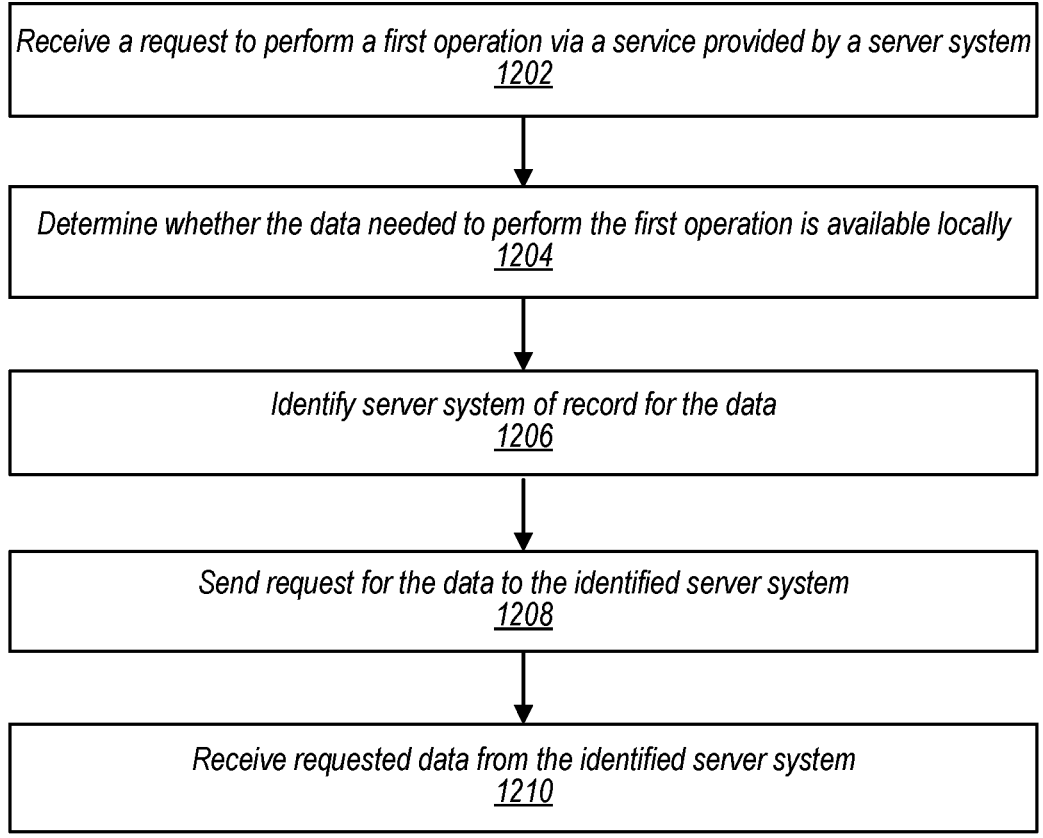
FIG. 12 is a flow diagram illustrating an example method for retrieving data from a server system located in a different network region, according to some embodiments.

Referring now to FIG. 12, a flow diagram illustrating an example method 1200 for retrieving data from a different network region 110 is depicted, according to some embodiments. In various embodiments, method 1200 may be performed by server system 102A of FIG. 9 to retrieve data from server system 102B located in network region 110B. For example, server system 102A may include (or have access to) a non-transitory, computer-readable medium having program instructions stored thereon that are executable by the server system 102A to cause the operations described with reference to FIG. 12. In FIG. 12, method 1200 includes elements 1202-1210. While these elements are shown in a particular order for ease of understanding, other orders may be used. In various embodiments, some of the method elements may be performed concurrently, in a different order than shown, or may be omitted. Additional method elements may also be performed as desired.

At 1202, in the illustrated embodiment, a first server system receives a request to perform an operation via a service provided by the first server system. For example, server system 102A may receive a request 902 to perform an operation associated with a user 116 who is associated with a different network region 110 than the server system 102A. In some embodiments, the request 902 may include (or otherwise indicate) an alias value 903 for such a user 116.

At 1204, in the illustrated embodiment, the first server system determines whether the data needed to perform the first operation is available locally. For example, an application 106A executing at server system 102A may send a request (e.g., via a GraphQL endpoint) to data access module 910 for the data needed to perform the requested operation. In such embodiments, the data access module 910 may check to see whether this data is stored locally in the data store 704A. If so, the data access module 910 may return this data to the requesting application 106A. If, as in the depicted embodiment, the requested data is not available locally, the method 1200 may proceed to 1206, at which the first server system identifies a server system of record for the data. In some embodiments, for example, this identification may be made by performing a lookup operation, using the alias value 903, in the alias map 114. In other embodiments, this identification may be made by analyzing the alias value 903 to locate an embedded region identifier for the server system of record for the data.

At 1208, in the illustrated embodiment, the first server system sends a request for the data to the identified server system. For example, as shown in FIG. 9, the server system 102A may direct a communication 912 to the server system 102B (the server system 102 of record for the data in the current example). Once this request is received, the server system 102B may authenticate an access token included in the request and, once authenticated, retrieve the requested data from a data store 704B. At 1210, in the illustrated embodiment, the first server system receives the requested data from the identified server system. This requested data may then be provided to the requesting application such that the requested operation may be performed by the first server system.

Example Computer System

Figure 13:
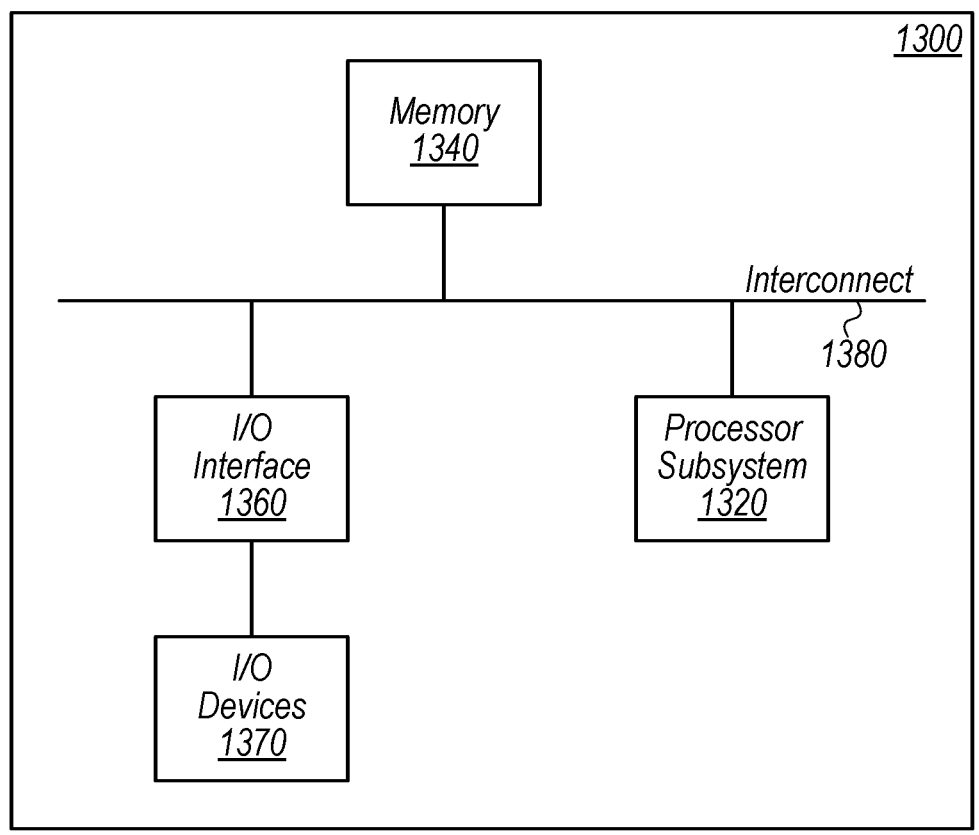
FIG. 13 is a block diagram illustrating an example computer system, according to some embodiments.

Referring now to FIG. 13, a block diagram of an example computer system 1300 is depicted, which may implement one or more computer systems, such as a server system 102 of FIG. 1 or one or more computer systems included in server system 102, according to various embodiments. Computer system 1300 includes a processor subsystem 1320 that is coupled to a system memory 1340 and I/O interfaces(s) 1360 via an interconnect 1380 (e.g., a system bus). I/O interface(s) 1360 is coupled to one or more I/O devices 1370. Computer system 1300 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 1300 is shown in FIG. 13 for convenience, computer system 1300 may also be implemented as two or more computer systems operating together.

Processor subsystem 1320 may include one or more processors or processing units. In various embodiments of computer system 1300, multiple instances of processor subsystem 1320 may be coupled to interconnect 1380. In various embodiments, processor subsystem 1320 (or each processor unit within 1320) may contain a cache or other form of on-board memory.

System memory 1340 is usable to store program instructions executable by processor subsystem 1320 to cause system 1300 perform various operations described herein. System memory 1340 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1300 is not limited to primary storage such as system memory 1340. Rather, computer system 1300 may also include other forms of storage such as cache memory in processor subsystem 1320 and secondary storage on I/O devices 1370 (e.g., a hard drive, storage array, etc.). In some embodiments, these other forms of storage may also store program instructions executable by processor subsystem 1320.

I/O interfaces 1360 may be any of various types of interfaces configured to couple to and communicate with other devices, according to various embodiments. In one embodiment, I/O interface 1360 is a bridge chip (e.g., Southbridge) from a front-side to one or more back-side buses. I/O interfaces 1360 may be coupled to one or more I/O devices 1370 via one or more corresponding buses or other interfaces. Examples of I/O devices 1370 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1370 includes a network interface device (e.g., configured to communicate over WiFi, Bluetooth, Ethernet, etc.), and computer system 1300 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation "[entity] configured to [perform one or more tasks]" is used herein to refer to structure (i.e., something physical). More specifically, this formulation is used to indicate that this structure is arranged to perform the one or more tasks during operation. A structure can be said to be "configured to" perform some task even if the structure is not currently being operated, A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., alias service module 112, synchronization module 306, validation service module 708, data access module 910, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:
receiving, by a first server system located in a first one of a plurality of network regions, a request from a first user to perform a first operation with a second user, wherein the request includes an alias value for the second user;
determining, by the first server system based on the alias value, that the second user is not associated with the first network region;
accessing, by the first server system, an alias map that specifies encoded versions of alias values that are in use across the plurality of network regions, wherein the first server system does not have access to a subset of alias values associated with users associated with one or more of the plurality of network regions;
determining, by the first server system, that the second user is associated with a second one of the plurality of network regions, wherein the determining includes:
generating a first encoded value based on the alias value;
comparing the first encoded value to the encoded versions of alias values specified in the alias map; and
determining that the first encoded value matches a second encoded value in the alias map, wherein the second encoded value is associated with an identifier for the second network region; and
routing, by the first server system, a first communication corresponding to the request to a second server system that is located in the second network region.

2. The method of claim 1, further comprising:
receiving, by the first server system from the second server system, a second communication that includes a limited set of data corresponding to the second user; and
creating, by the first server system, a proxy account associated with the second user in the first server system, wherein the proxy account includes at least a portion of the limited set of data.

3. The method of claim 2, further comprising:
performing, by the first server system, the first operation based on the at least a portion of the limited set of data included in the proxy account for the second user.

4. The method of claim 3, wherein the limited set of data corresponding to the second user includes a public identifier for a second user account of the second user in the second network region, and wherein the method further comprises:
creating, by the first server system for the second user account in the second network region, a local account number to identify the proxy account in the first network region; and
the first server system updating the proxy account to associate the local account number with the public identifier for the second user account in the second network region.

5. The method of claim 1, wherein the first communication includes a token that specifies a first limited set of data corresponding to the first user.

6. The method of claim 1, further comprising:
receiving, by the first server system from the second server system located in the second network region, a second request to perform a second operation associated with a particular user that is associated with the first network region, wherein the second request includes a third encoded value based on a particular alias value for the particular user, wherein the second request does not include a plaintext version of the particular alias value;
performing, by the first server system, a lookup operation in the alias map using the third encoded value to determine that the third encoded value matches the first encoded value; and identifying, by the first server system, the first user as the particular user associated with the second request to perform the second operation.

7. The method of claim 1, further comprising:
performing, by the first server system, an authentication operation to establish a security context for the first user within the first server system; and
wherein the first communication includes one or more items of context information associated with the security context for the first user.

8. A server system located in a first one of a plurality of network regions, the server system comprising:
a data storage device storing alias information that includes:
a first set of alias values for a first subset of users that are associated with the first network region; and
an alias map specifying encoded versions of alias values that are in use across the plurality of network regions;
at least one processor; and
a non-transitory, computer-readable medium having instructions stored thereon that are executable by the at least one processor to cause the server system to:
receive a request for the server system to perform an operation for a particular user having a particular alias value;
using the alias map, identify one of the plurality of network regions with which the particular user is associated, including by:
determining that the particular alias value does not match any of the first set of alias values, indicating that the particular user is not associated with the first network region;
comparing an encoded version of the particular alias value to the encoded versions of alias values specified in the alias map; and
based on the comparing, determining that the particular user is associated with a second network region; and
send a communication corresponding to the request to a second server system located in the second network region.

9. The server system of claim 8, wherein the communication includes a second request for a limited set of data corresponding to the particular user to facilitate the operation.

10. The server system of claim 9, wherein instructions are further executable by the at least one processor to cause the server system to:
receive, from the second server system, a second communication that includes the limited set of data corresponding to the particular user;
create a proxy account for the particular user based on the limited set of data; and
perform the operation based on at least a portion of the limited set of data included in the proxy account for the particular user.

11. The server system of claim 8, wherein the request is an application programming interface ("API") request received, by the server system, from a third-party application hosted by a third-party system.

12. The server system of claim 8, wherein the instructions are further executable by the at least one processor to cause the server system to:
receive a second request to perform a second operation, wherein the second request specifies a second alias value that includes an embedded region identifier;
determine, based on the embedded region identifier, that the second alias value is associated with the second network region; and
send a second communication corresponding to the second request to the second server system that is located in the second network region.

13. The server system of claim 8, wherein the request is received from a first user that is associated with the first network region, and wherein the communication includes a token that specifies a limited set of data corresponding to the first user.

14. The server system of claim 13, wherein the instructions are further executable by the at least one processor to cause the server system to:
perform an authentication operation to establish a security context for the first user within the server system; and
wherein the token further specifies one or more items of context information associated with the security context for the first user.

15. A method, comprising:
receiving, by a first server system located in a first one of a plurality of network regions, a request to perform a first operation via a service provided via the first server system, wherein the request includes a particular alias value for a particular user of the service;
accessing, by the first server system, alias information associated with users of the service, wherein the alias information includes:
a first set of alias values for a first subset of the users of the service that are located in the first network region; and
an alias map that specifies encoded versions of alias values that are in use, for the service, across the plurality of network regions in which the service is provided;
determining, by the first server system based on the first set of alias values, that the particular user is not located in the first network region; and
determining, by the first server system based on the alias map, that the particular user is located in a second one of the plurality of network regions, including by:
generating a first encoded value based on the particular alias value;
comparing the first encoded value to the encoded versions of alias values specified in the alias map; and
determining that the first encoded value matches a second encoded value in the alias map, wherein the second encoded value is associated with an identifier for the second network region.

16. The method of claim 15, further comprising:
routing, by the first server system, a first communication corresponding to the request to a second server system that is located in the second network region; and
receiving, by the first server system from the second server system, a second communication that includes a limited set of data corresponding to the particular user.

17. The method of claim 16, further comprising:
creating, by the first server system, a proxy account associated with the particular user in the first server system, wherein the proxy account includes at least a portion of the limited set of data; and
performing, by the first server system, the first operation using the proxy account for the particular user.

18. The method of claim 17, wherein the limited set of data corresponding to the particular user includes a public identifier for a particular user account of the particular user in the second network region, and wherein the method further comprises:

creating, by the first server system for the particular user account in the second network region, a local account number to identify the proxy account in the first network region; and the first server system updating the proxy account to associated the local account number with the public identifier for the particular user account.

19. The method of claim 15, further comprising:

receiving, by the first server system, a second request to perform a second operation, wherein the second request specifies a second alias value that includes an embedded region identifier;

determining, by the first server system based on the embedded region identifier, that the second alias value is associated with the second network region; and sending, by the first server system, a second communication corresponding to the second request to a second server system that is located in the second network region.

20. The method of claim 19, wherein the determining that the second alias value is associated with the second network region includes parsing the second alias value to identify, at a predetermined location within the second alias value, the embedded region identifier; and wherein the method further comprises:

generating an authentication token to identify the first network region, wherein the authentication token is included in the second communication to the second server system.

\* \* \* \* \*